J. G. VINCENT.
CALCULATOR.
APPLICATION FILED FEB. 8, 1911.
1,218,136.
Patented Mar. 6, 1917.
16 SHEETS—SHEET 1.
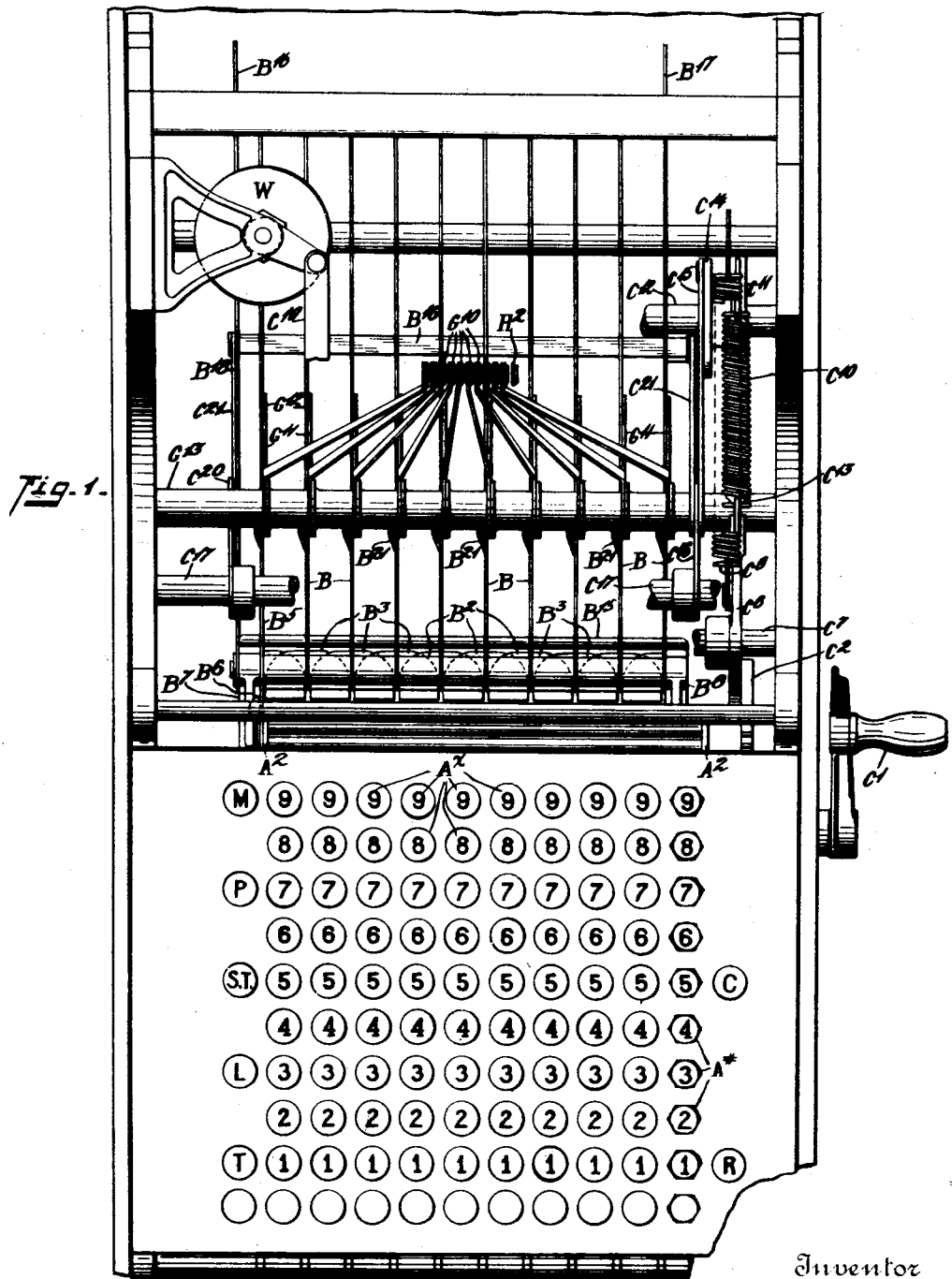

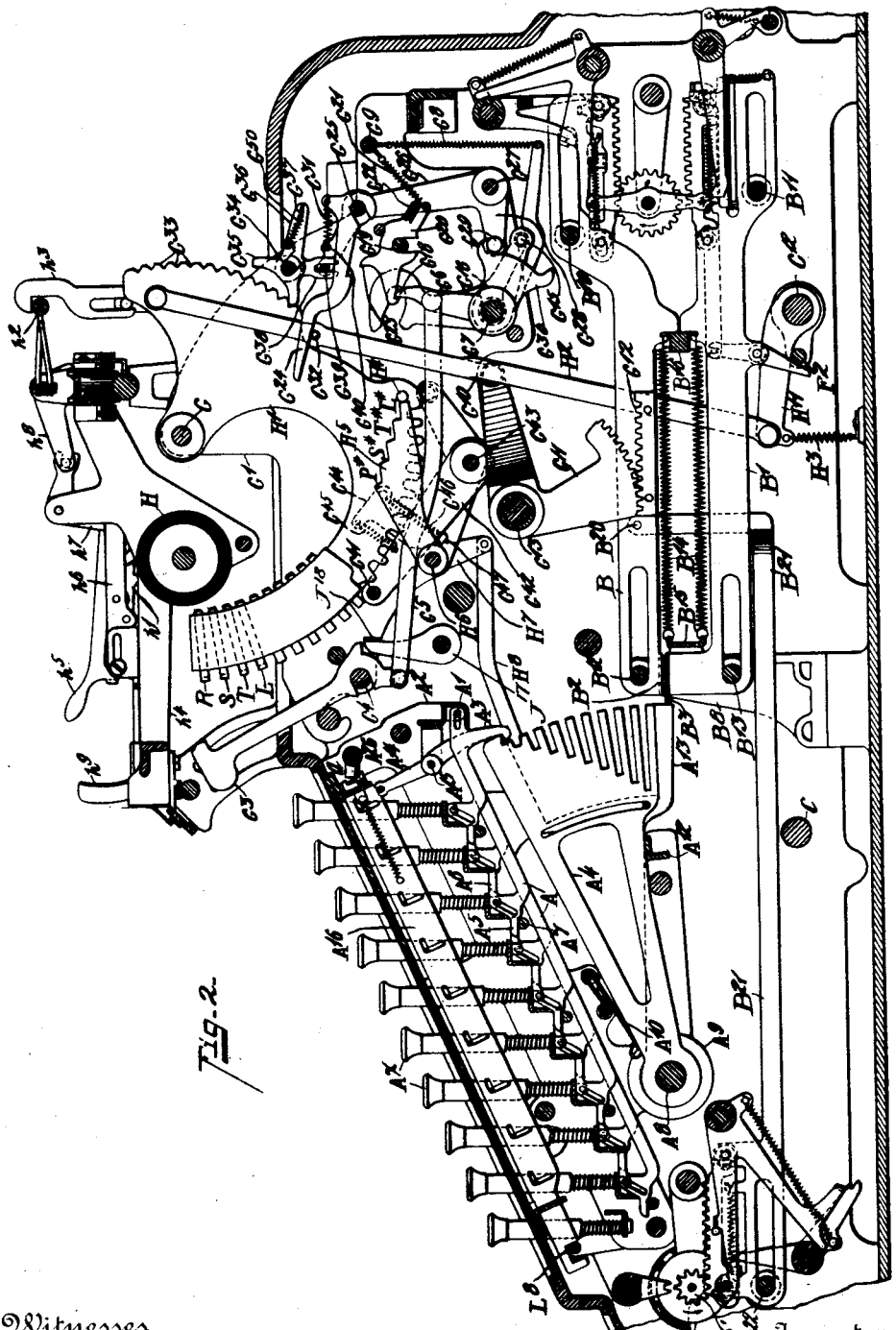

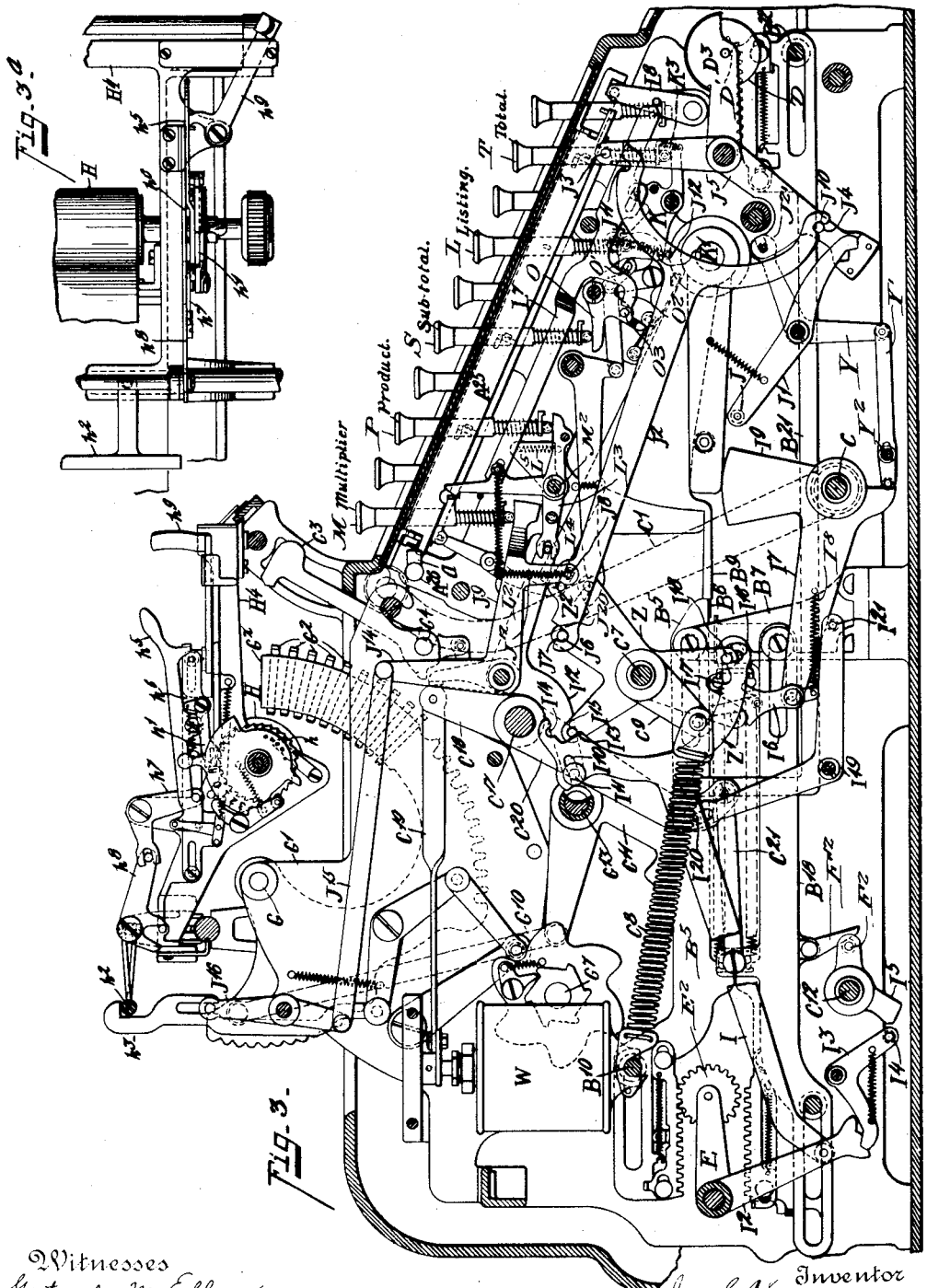

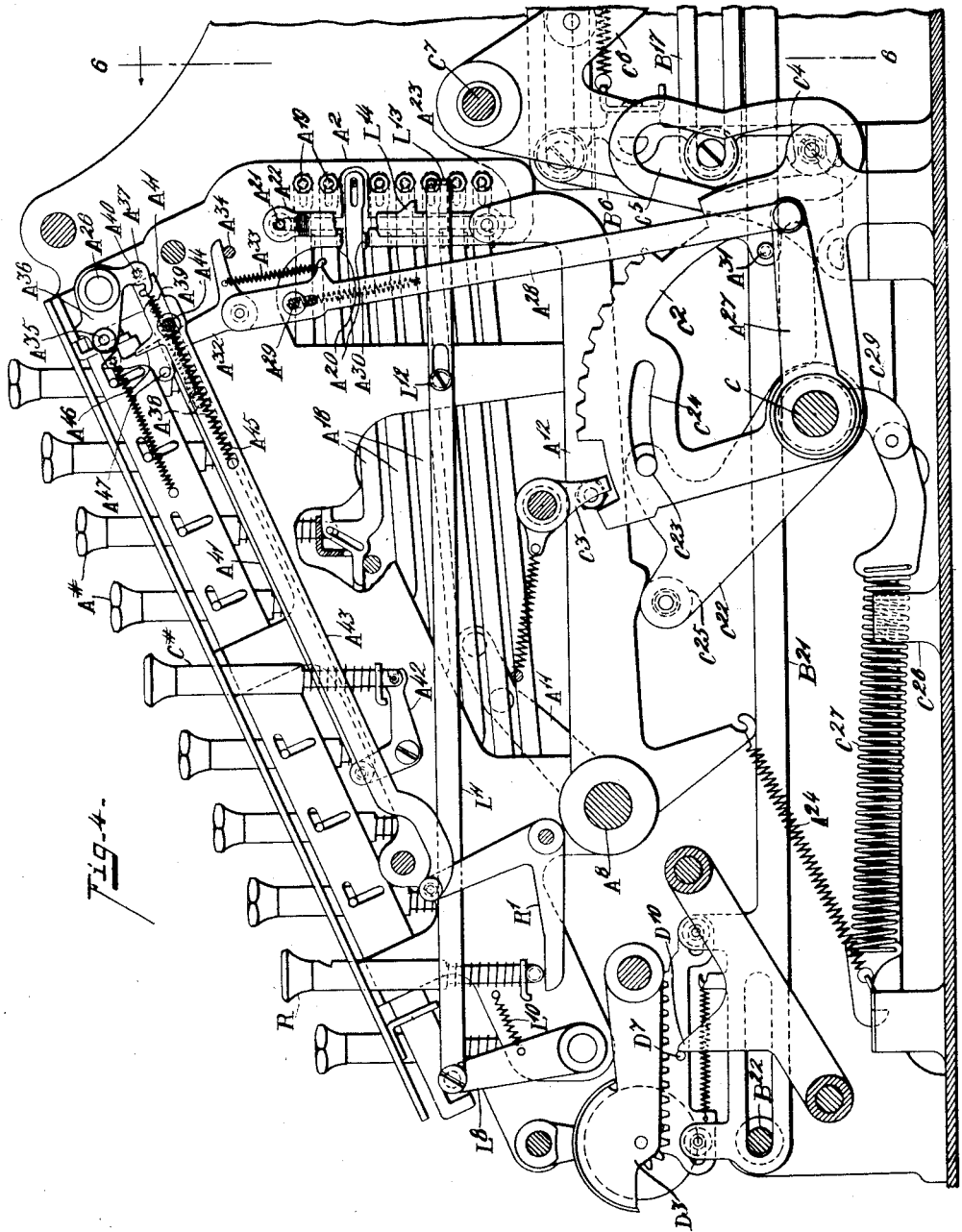

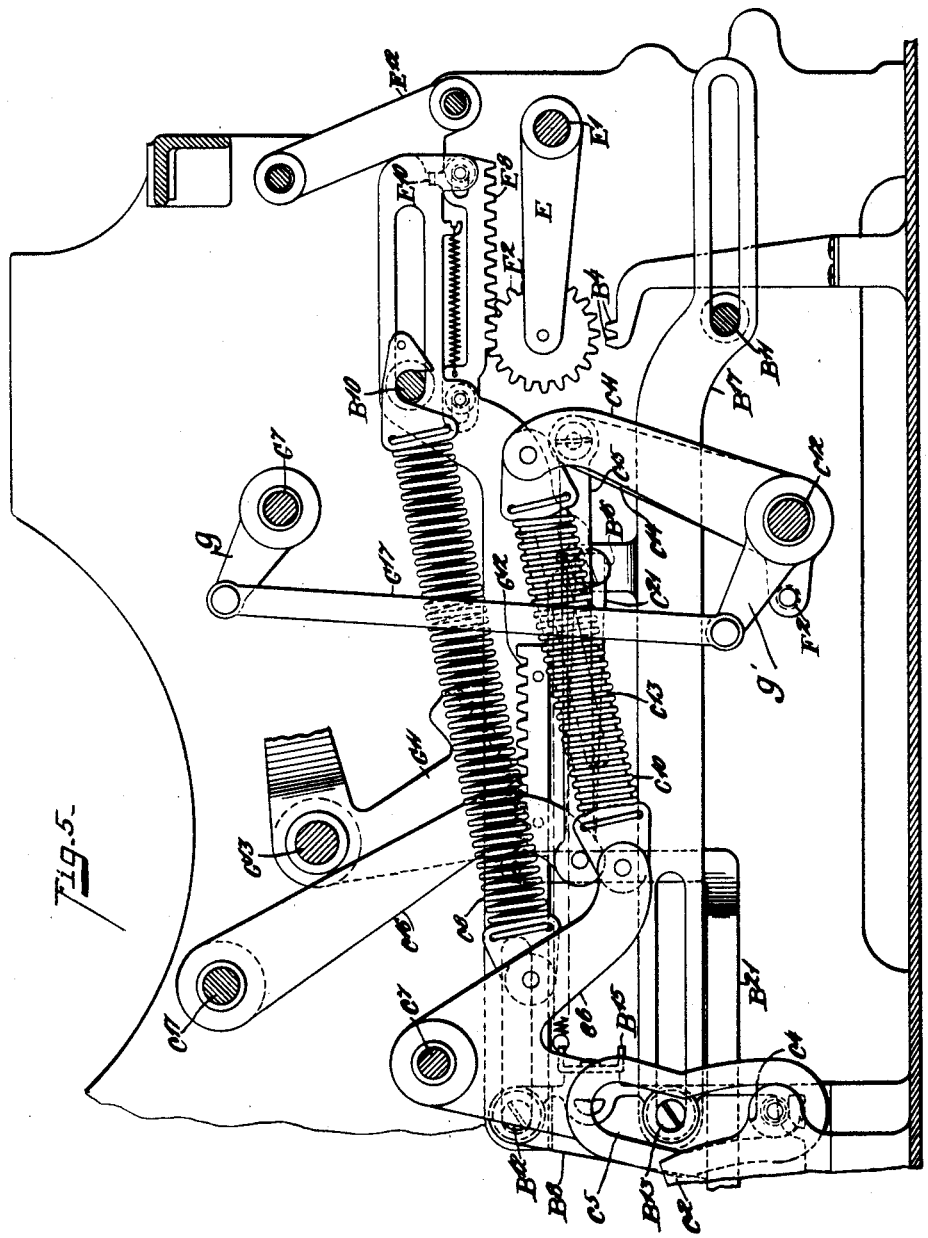

J. G. VINCENT.
CALCULATOR.
APPLICATION FILED FEB. 8, 1911.
1,218,136.
Patented Mar. 6, 1917.
16 SHEETS—SHEET 6.
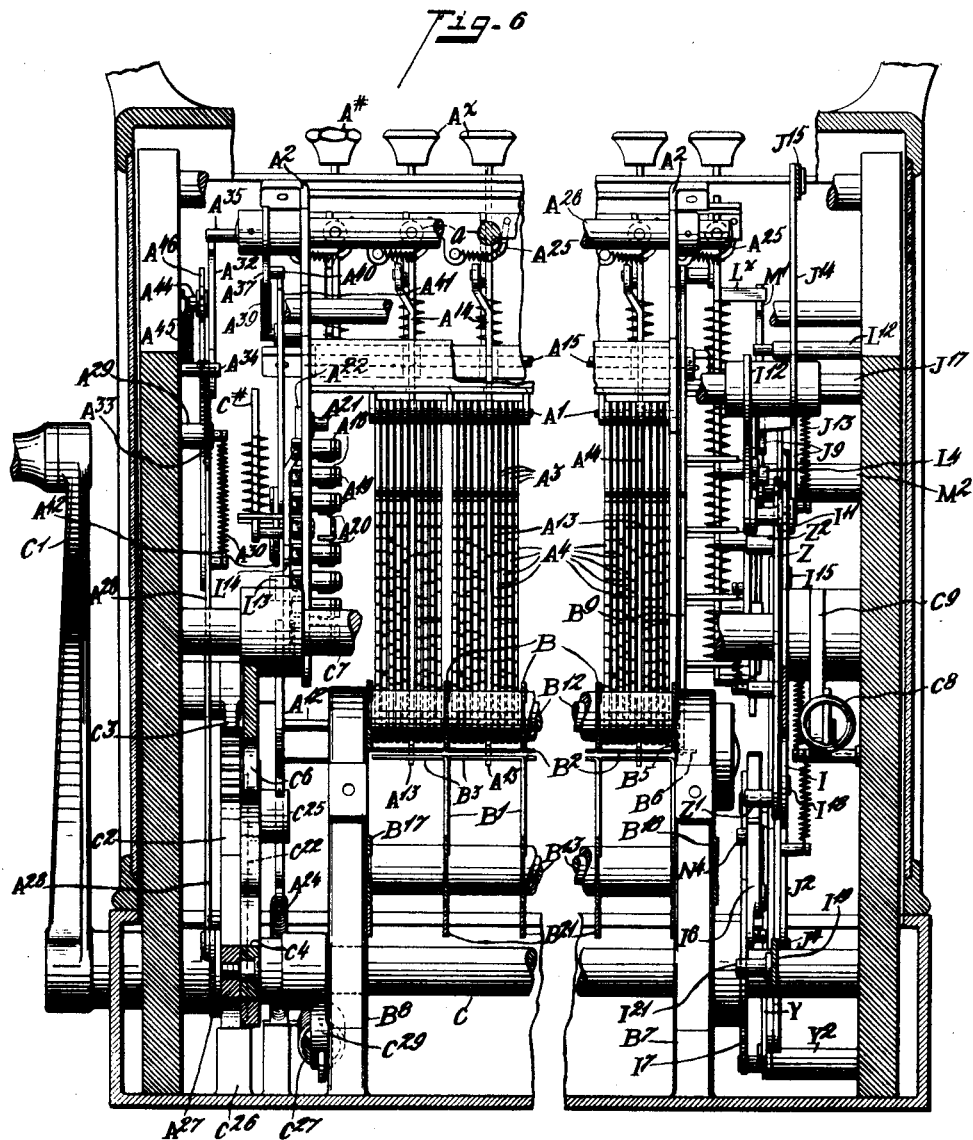

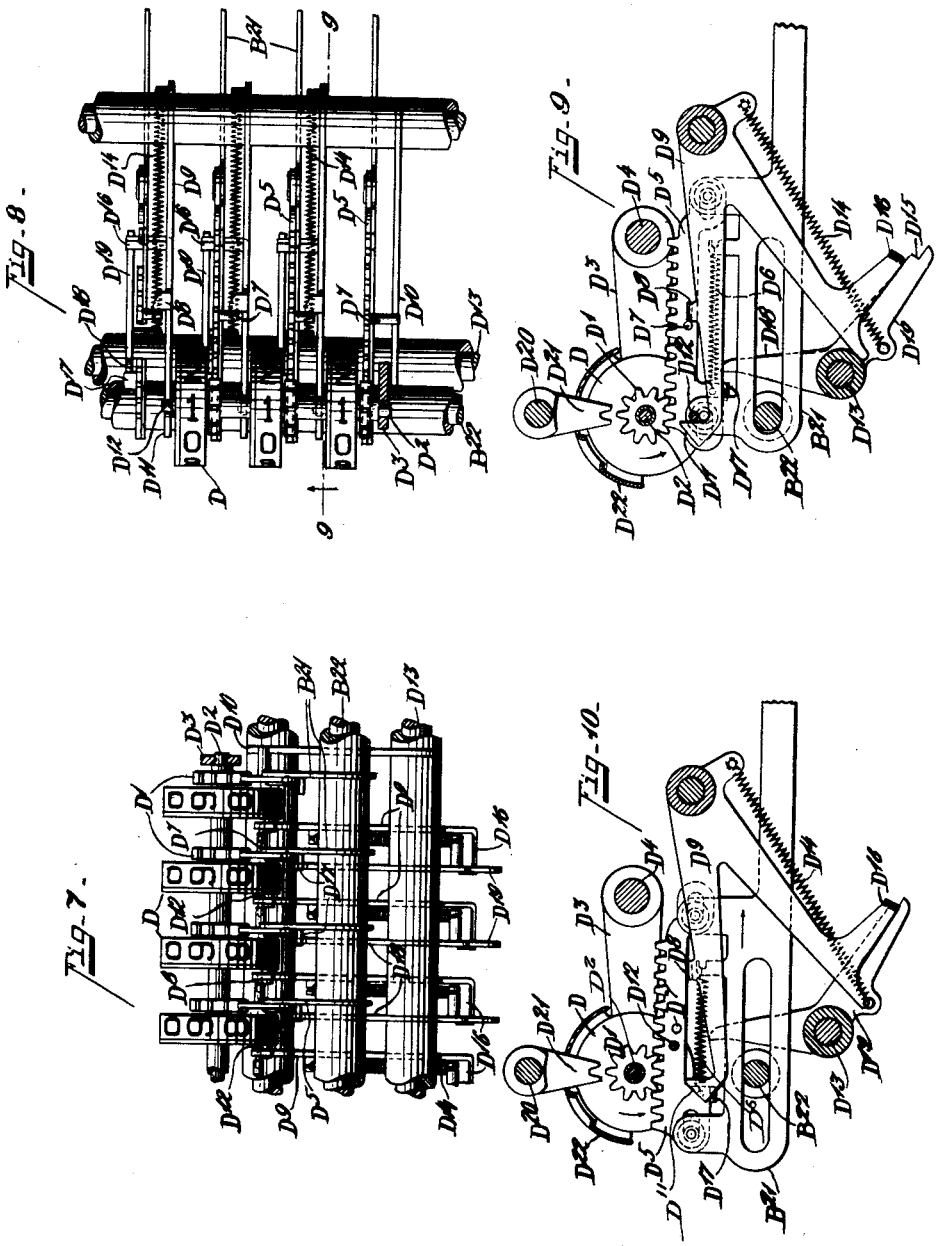

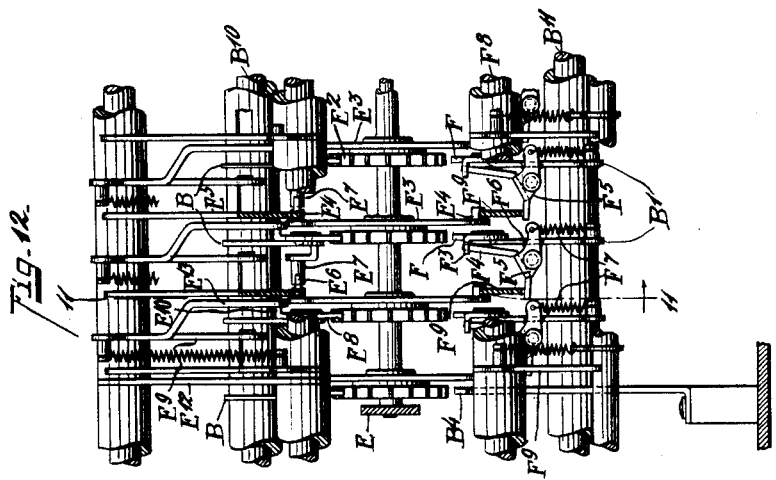
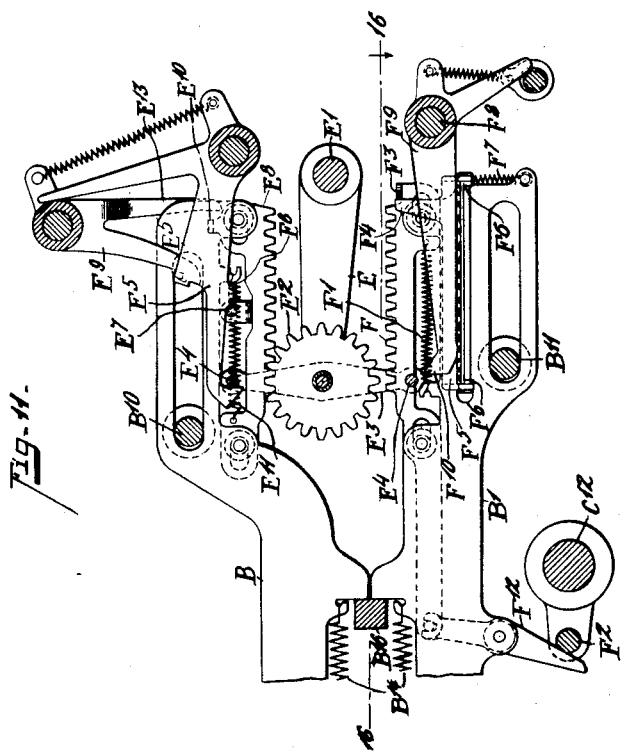

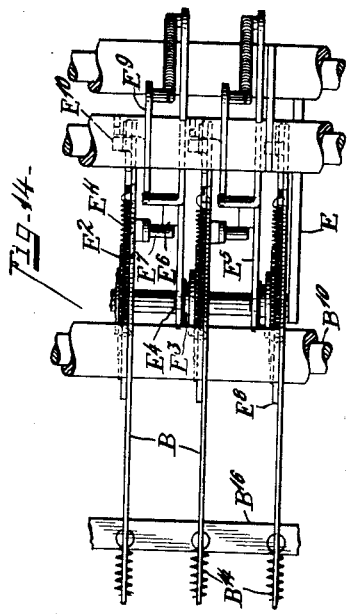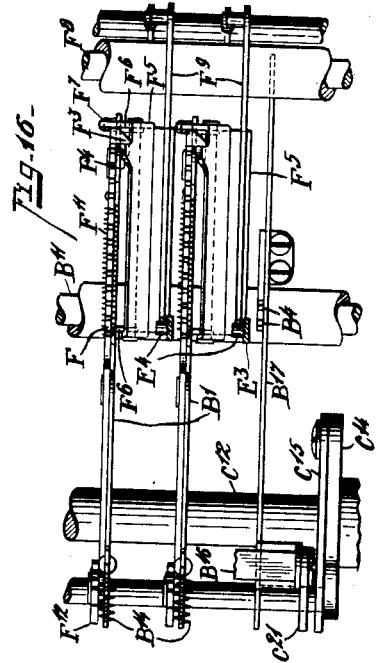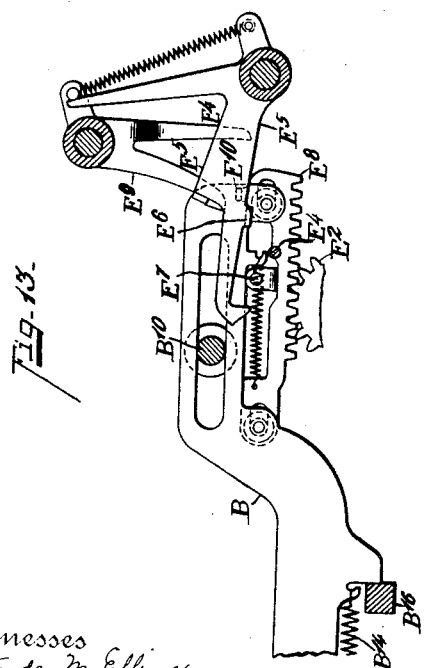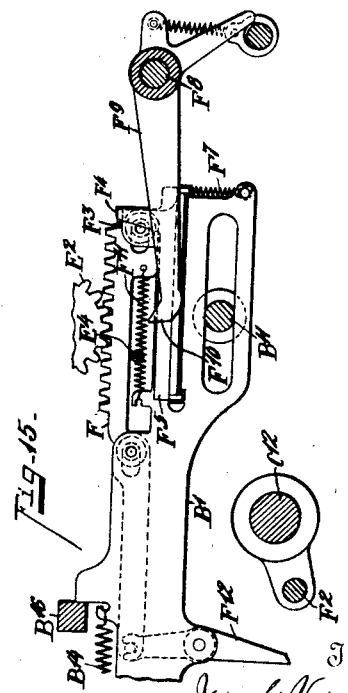

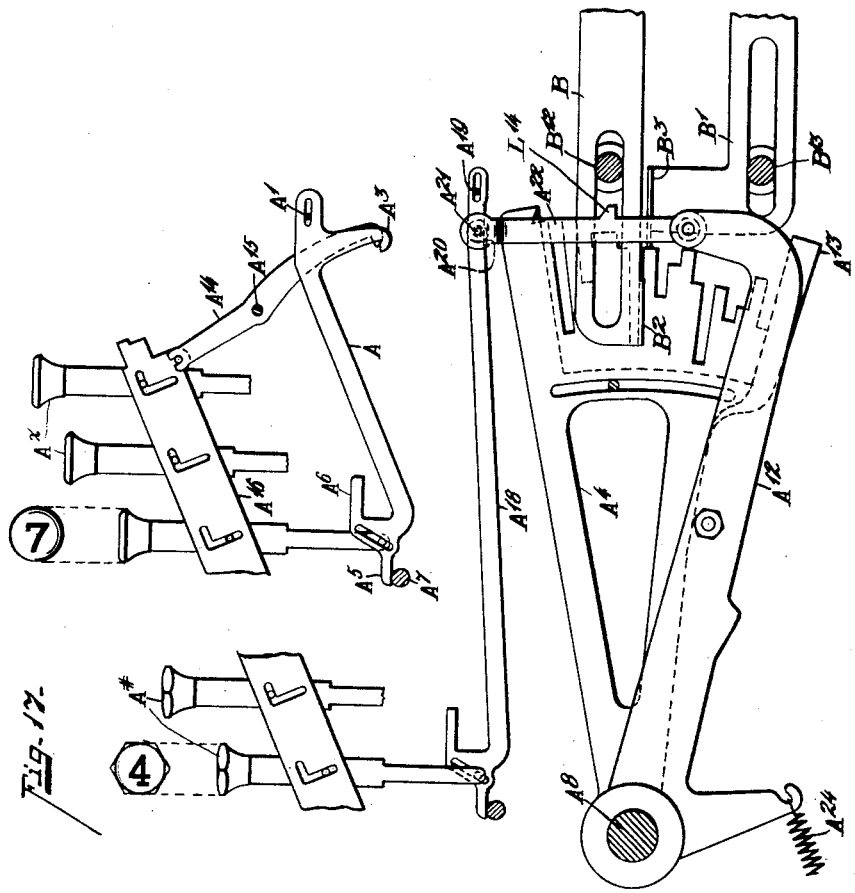

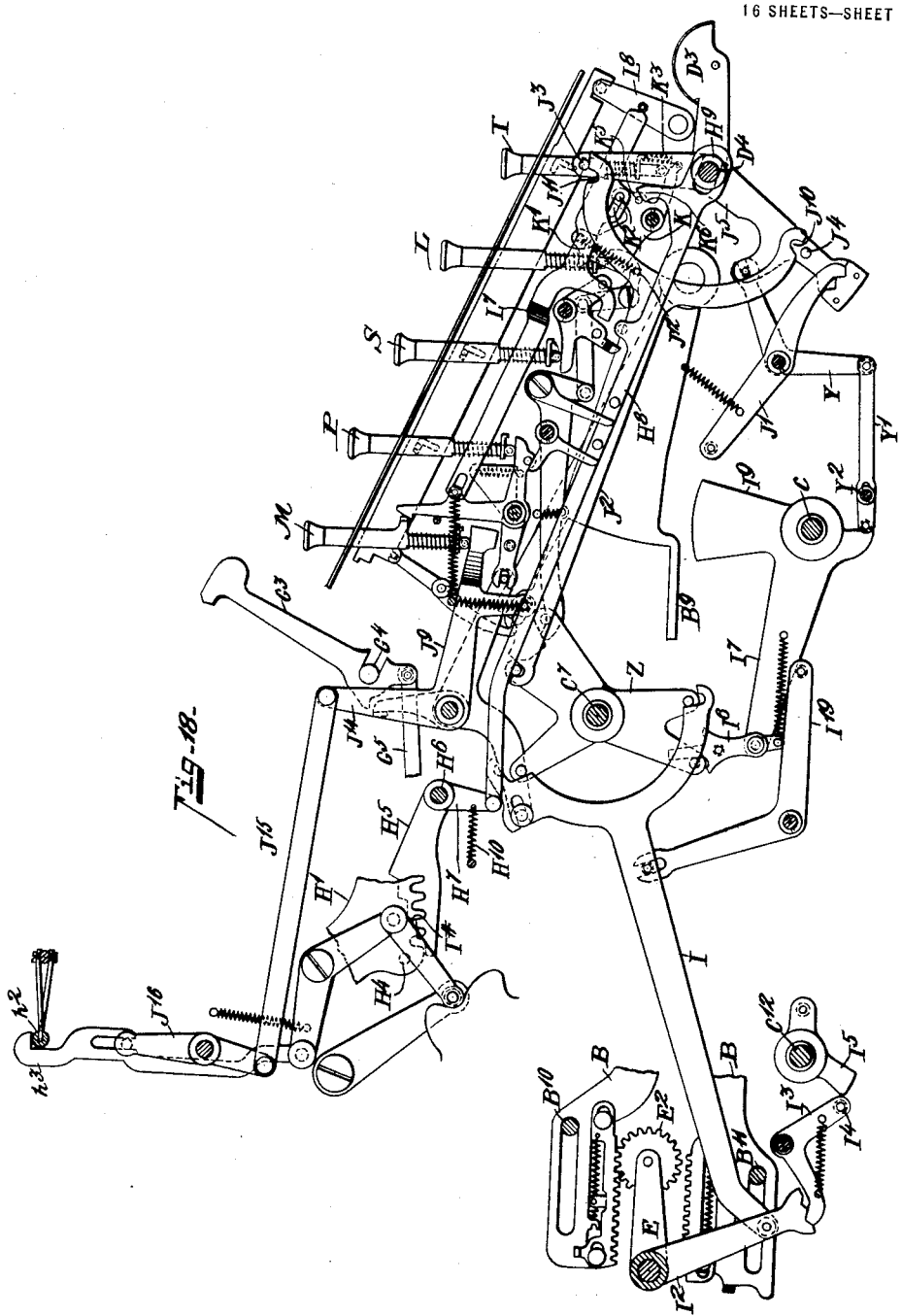

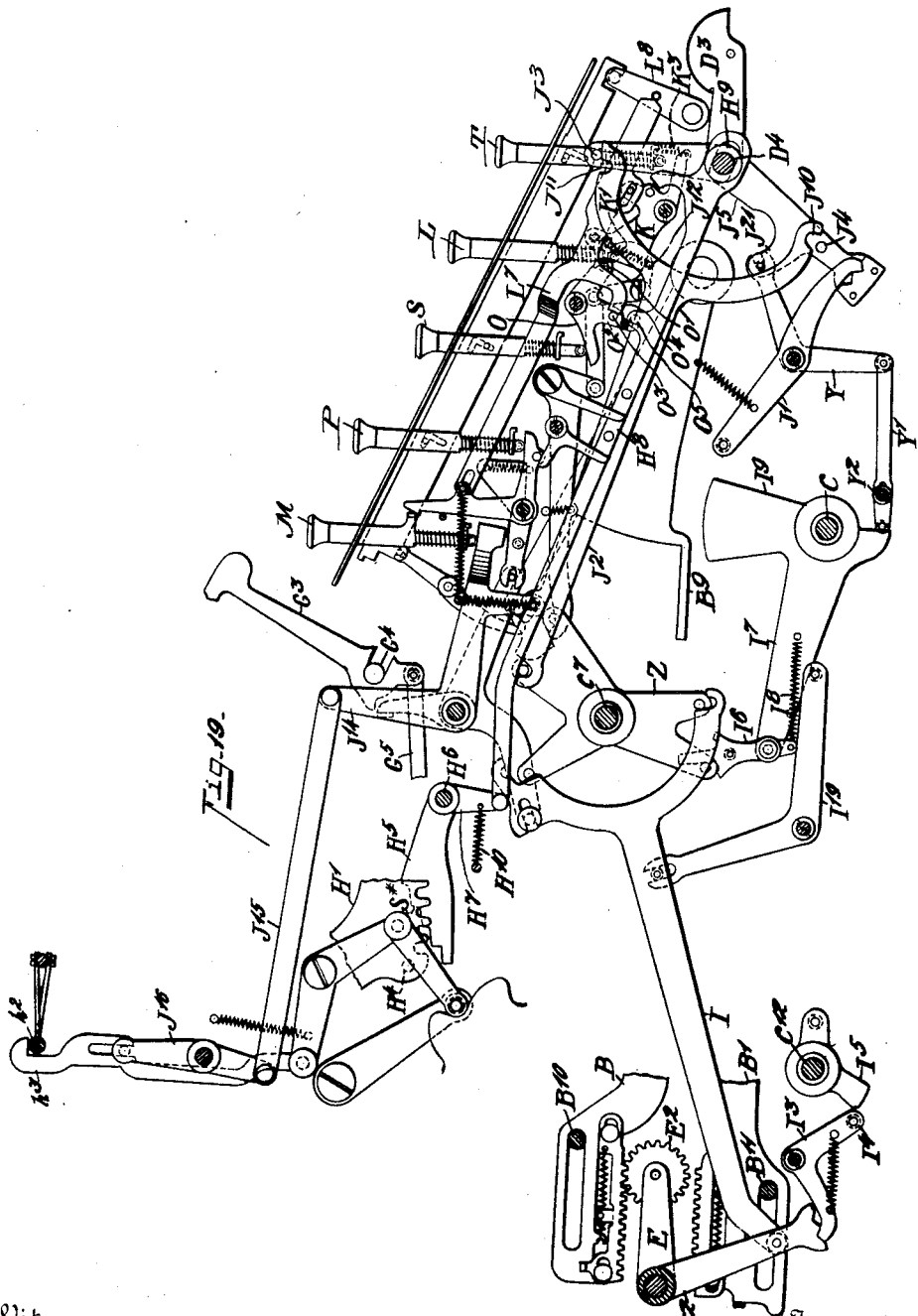

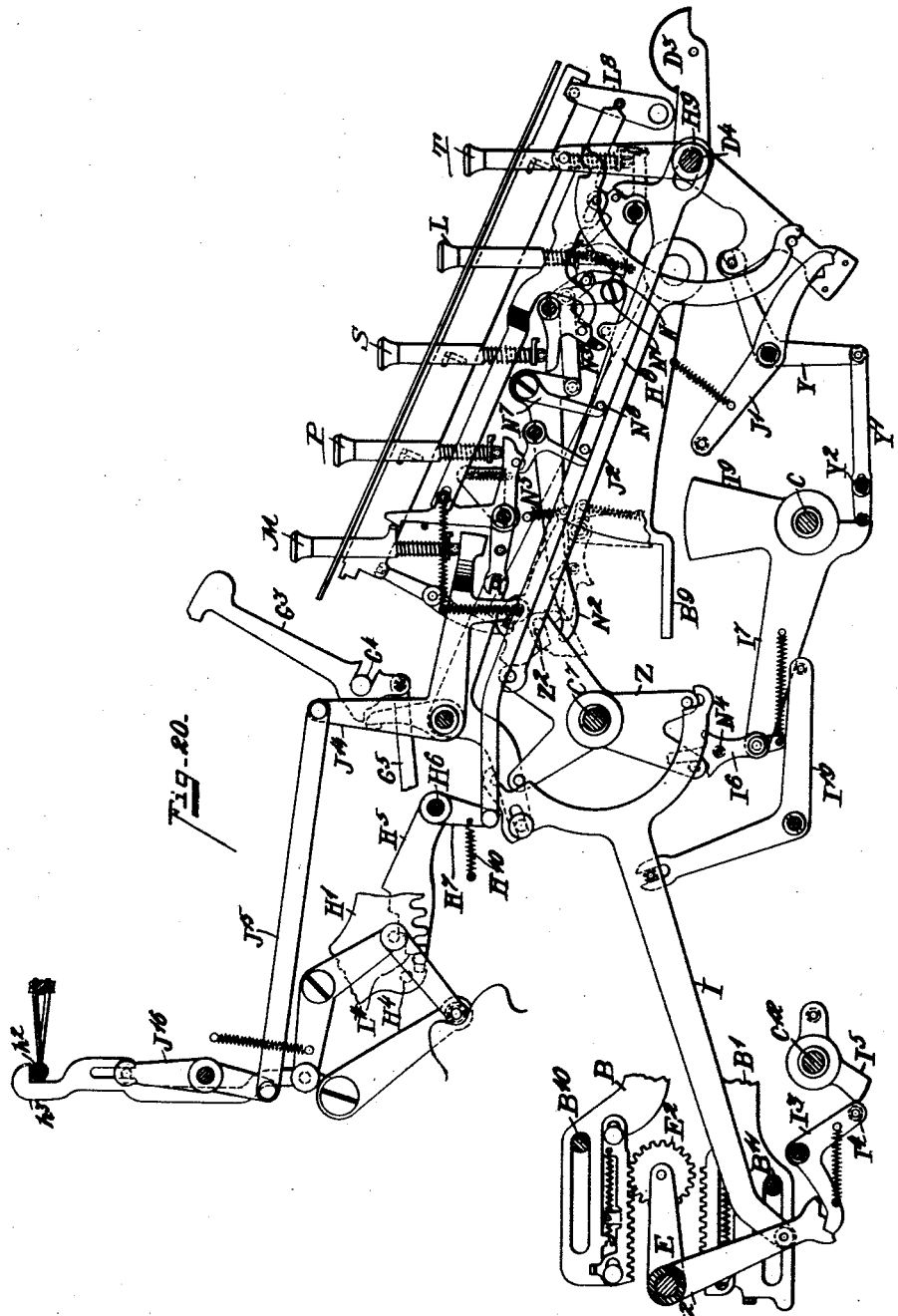

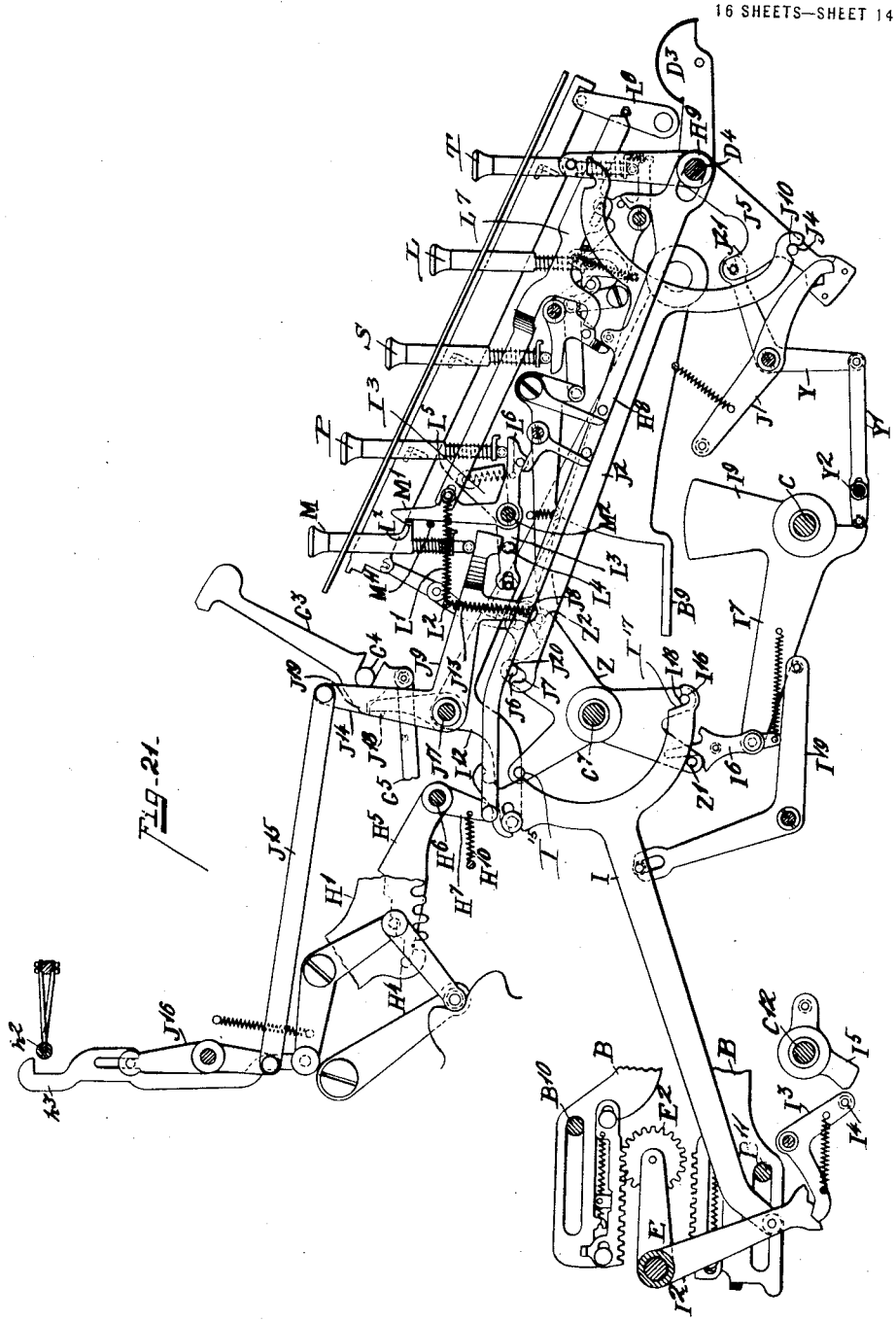

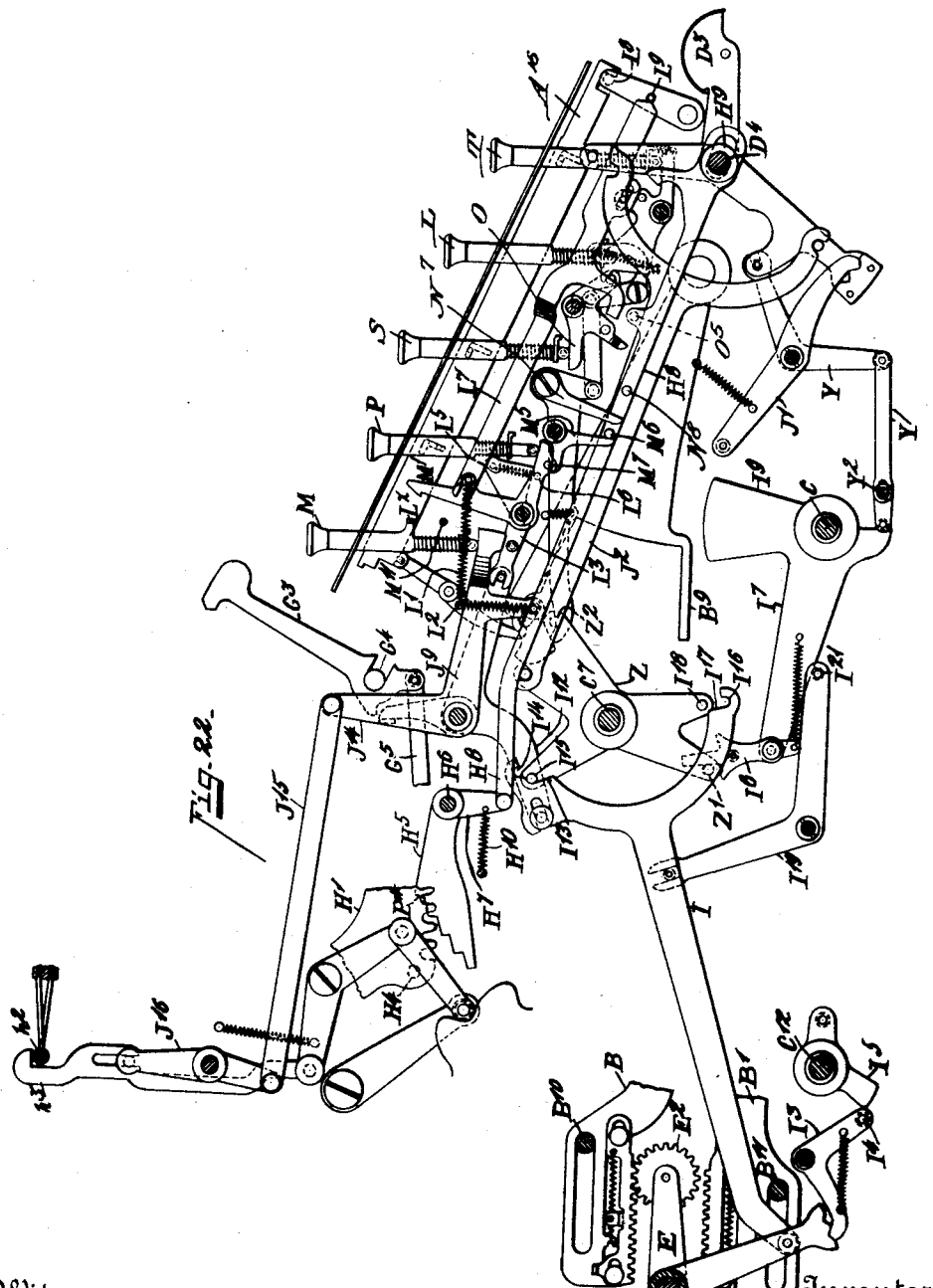

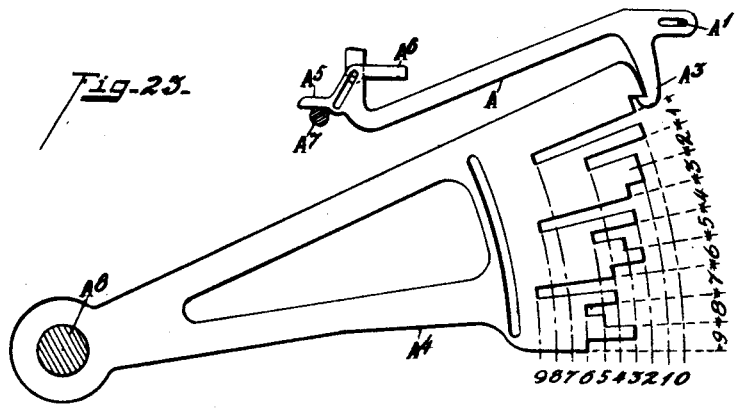

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

CALCULATOR.

1,218,136. Specification of Letters Patent. Patented Mar. 6, 1917.

Application filed February 8, 1911. Serial No. 607,282.

*To all whom it may concern:*

Be it known that I, JESSE G. VINCENT, a citizen of the United States, residing at Detroit, county of Wayne, and State of Michigan, have invented certain new and useful Improvements in Calculators, of which the following is a specification.

The present invention relates primarily to the matter of equipping an accounting machine with means for performing multiplication and the principal object is to accomplish direct multiplication by a single operation of the machine for each digit of a multiplier. Thus, having set up on the keyboard the multiplicand and a digit of the multiplier, a single pull of the operating handle will result in registering the product which in the case of a multiplier of a single digit will be the complete product, but in the case of a multiplier of more than one digit will be a partial product. In the latter case the multiplicand will be again set up on the keyboard one decimal place to the left and with the next digit of the multiplier set up a single pull of the operating handle will add to the partial product another partial product and so on until the complete product is registered.

With the above object in view, the invention consists in certain novel features of construction and combinations of parts the essential elements whereof are recited in the appended claims and a preferred form of embodiment of which is described in detail hereinafter and fully illustrated in the accompanying drawings forming a part of this specification.

Of said drawings, Figure 1 is a top plan view of the machine with the printing mechanism removed to show other parts more clearly; Fig. 2 is a vertical transverse section taken approximately through the center of the machine; Fig. 3 is a left-hand elevation of the machine with some parts removed for the sake of clearness; Fig. 3ᵃ is a top plan view of the left-hand end of the platen carriage showing the line spacing mechanism; Fig. 4 is a partial right side elevation; Fig. 5 is a continuation of Fig. 4; Fig. 6 is a vertical sectional view taken on line 6—6 of Fig. 4 and looking in the direction of arrow crossing said line; Fig. 7 is a front elevation of part of the front accumulator; Fig. 8 is a top plan view of Fig. 7; Fig. 9 is a section of the front accumulator taken on line 9—9 of Fig. 8 looking in the direction of arrow crossing said line with parts at normal; Fig. 10 is a view similar to Fig. 9 but with the transfer tripped and the rack-bar traveling in the direction of the arrow thereon; Fig. 11 is a longitudinal vertical section of the rear accumulator and its transfer mechanisms taken on the line 11—11 of Fig. 12; Fig. 12 is a rear view of Fig. 11; Fig. 13 is a detail view of the transfer mechanism of the upper (units) racks in tripped position, the racks being shown moved forward from normal position; Fig. 14 is a top plan view of the transfer mechanism of the upper (units) racks in normal position as shown in Fig. 11; Fig. 15 is a detail view of the transfer mechanism of the lower (tens) racks in tripped position, the racks being shown moved forward from normal position; Fig. 16 is a top plan view (taken on the line 16—16 of Fig. 11) of the transfer mechanism of the lower (tens) racks in normal position as shown in Fig. 11; Fig. 17 is a detail view of part of the multiplier bank and part of an amount bank, with a key depressed in each, also the stepped segment for the depressed amount key in operated position controlling the positioning of the actuating racks; Fig. 18 is a left side elevation of the front portion of the machine, showing effect of depressing the total key; Fig. 19 is a view like Fig. 18, showing the subtotal key depressed; Fig. 20 is a view like Fig. 18, showing the listing key depressed; Fig. 21 is a view like Fig. 18, showing the multiplication key depressed; Fig. 22 is a view like Fig. 18, showing the product key depressed; Fig. 23 is a detail view of the graduated stop plate of the seven (amount) key; Fig. 24 is a sample of the work in single column formation, using the automatic line-spacing mechanism; Fig. 25 is a sample of the work in triple column formation with the automatic line-spacing mechanism thrown out.

*General description.*

The principal sections of the machine are as follows: The keyboard which controls the positioning of the graduated stop plates and the movements of the accumulators; the rear accumulator upon which the different operations of multiplication are accumulated; the front accumulator upon which addition is performed and to which the multiplication products are transferred from the rear accumulator; the printer section for printing amounts, multiplicands, multipliers, products, subtotals and totals and special characters distinguishing the imprints; and the driving mechanism.

In the present machine there are nine banks of amount keys and one bank of multiplier keys, said multiplier keys being the first bank at the right and having hexagon heads. Each bank of amount keys is provided with nine graduated stop plates having their peripheries slotted according to the multiplication table. The depression of an amount key releases its own individual stop plate.

In addition to the nine stop plates, each bank is provided with an initial stop plate which is released when any key in its associated bank is depressed. This initial stop plate, in its normal position, blocks the tens (lower) rack and forms a stop for the units (upper) rack, thus limiting the movement of the type carrier so as to set the zero type for printing. The multiplier keys determine the distance the released graduated stop plates will be allowed to drop.

The following sequence of operations is followed in performing an example in multiplication. If, e. g. we are to multiply 5483 by 683, we first press the "listing" (L) key and set up 5483 (the multiplicand) on the first four banks of amount keys. The depression of the listing key serves to prevent the item from being accumulated. The machine is now operated to list or print the multiplicand. The next step is to set up the multiplier on the amount keys and depress the listing key. The machine now being operated prints the multiplier just below the multiplicand thus:

5483
683

To proceed we now press the multiplication (M) key which serves to block the printing hammers and to disable the automatic line-spacing mechanism of the carriage. The multiplicand 5483 is then again set up on the first four banks of amount keys. This releases the stop plates in each bank corresponding to the keys depressed. The first digit (3) of the multiplier is now set up on the multiplier bank. This determines how far the release stop plates will drop when the machine is operated. The machine is now operated and the product of 5483 multiplied by 3 is accumulated on the rear accumulator. At the end of this operation the depressed keys (excepting the M key) are released.

The next step is to set up the multiplicand on the amount keys, but this time it is moved to the left one bank or denomination, i. e., the multiplicand is set up on the second, third, fourth and fifth banks. The second digit (8) of the multiplier is now set up on the multiplier bank and the machine operated. This product is accumulated on the rear accumulator as stated above in connection with the product of the first digit of the multiplier.

This operation is repeated for each digit in the multiplier.

As hereinbefore stated, the M key remains depressed until the P key is depressed. The P (or product) key it depressed after the above operation is repeated for each digit of the multiplier. The depression of said key serves to lock all of the amount keys and the multiplier keys against depression and to release the M (or multiplication) key, also to so set the controlling mechanism of the accumulators that upon operation of the machine the product of multiplication as accumulated on the rear accumulator will be transferred to the front accumulator.

In plain addition the amounts are added directly on the front accumulator as will be hereinafter explained. Of course addition can also be done on the rear accumulators by using the one (1) multiplier key, in which case the operation will be precisely as in multiplication.

*Keyboard*, (Figs. 1, 2, 4, 6 and 17.)

Referring to Fig. 2, the keys $A^x$ slide through slots in the keyboard plate and through slots in a series of angle brackets below said keyboard plate. The keys are normally upheld by springs surrounding the stems between the brackets and suitable shoulders on the keys. Each key is provided at its lower end with a pin which engages in an oblique slot in a releasing bar A. Said bars are slotted at their rearward ends and are supported and guided by a cross-rod $A^1$ which is mounted in an angle bracket running between the two keyboard frames $A^2$ and supported thereby. The releasing bar A has at its rearward end a depending hooked projection $A^3$ which engages with and upholds its corresponding stop plate $A^4$. The releasing bars A have short forward extensions $A^5$ at their forward ends and also have short rearward extensions $A^6$ just back of the obliquely slotted portion. By this arrangement one cross rod $A^7$ serves to support two releasing levers of each bank. For instance, the releasing lever of the seven (7) key is supported at its forward end by reason of the engagement of its forward extension $A^5$ over the cross-rod $A^7$ which extends under the rearward extension $A^6$ of the next lower releasing lever, thereby also supporting said lever.

The releasing levers A are held from lateral displacement at their forward ends by engagement in slots in the vertical portions of the angle brackets guiding the key stems, each lever being guided by two of the angle brackets, the forward extension $A^5$ engaging in the slot of the bracket immediately above it and the rearward extension $A^6$ engaging in the slot of the next higher bracket.

It will be obvious that the depression of any amount key will cause rearward movement of its releasing lever A by reason of the cam action between the pin in the key stem and the oblique slot in said lever. This rearward movement of the releasing lever A of any amount key will remove the hooked projection $A^3$ from engagement with its corresponding stop plate which will be lowered to a predetermined position when the machine is operated. Of course it is understood that there are nine of these graduated stop plates $A^4$ for each amount bank (see Fig. 6). These plates are mounted loosely upon a cross-rod $A^8$ which extends between the two keyboard frames $A^2$. Said plates are spaced on the cross rod $A^8$ by circular disks or washers $A^9$ which also serve to hold from displacement the forward ends of springs $A^{10}$. Said springs are bent around two cross rods and are separated thereon by small disks or washers. The forward ends of the springs rest on the upper edge of the plates $A^4$ and tend to force said plates downward. The two cross-rods supporting the said springs are supported at their left-hand ends in the left-hand keyboard frame $A^2$ and on their right-hands ends in a bracket $A^{11}$ which is secured to the cross-rod $A^8$ which is mounted rigidly in the keyboard frames $A^2$ (see Fig. 4). This is done so as to avoid interference with mechanism of the multiplier bank.

The released stop plates $A^4$ are upheld, until the machine is operated, by a restoring bail $A^{12}$ which is operated by mechanism to be hereinafter described.

It is not only necessary that the depression of an amount key shall release its associated stop plate, but by the same act the initial stop plate $A^{13}$ must of course be withdrawn from the path of the actuating racks.

These initial stop plates are similar in form to the amount stop plates and are more clearly shown in dotted lines in Fig. 17.

The latching pawls $A^{14}$ of the initial stop plates are pivoted on a cross-rod $A^{15}$ and have pin-and-slot connections with locking detents $A^{16}$ actuated by pins on the key stems coacting with oblique slots in said detents. As will be seen by referring to Fig. 17, the depression of a key in any bank will cause all of the remaining keys in said bank to be locked.

Fig. 17 shows the seven (7) key of an amount bank depressed thereby releasing its graduated stop plate and also the initial stop plate of that bank.

Referring next to the multiplier bank, Figs. 4 and 6, it will be noted that the key construction is similar to that of the amount keys, the pins in the lower ends of the keys $A^{\#}$ engaging in oblique slots in a series of stop bars $A^{18}$ which extend rearwardly and are guided on studs $A^{19}$ secured to the keyboard frame $A^2$. Said stop bars $A^{18}$ are provided with laterally extending ears $A^{20}$ which are adapted, when the keys are depressed, to be moved into the path of a stud $A^{21}$ secured to the top of a vertical link $A^{22}$ and guided in its vertical reciprocation by a slot $A^{23}$ cut into the keyboard frame $A^2$. Said link is connected to an upturned end of the right side arm of the restoring bail $A^{12}$. A spring $A^{24}$ normally exerts its tension to lower said bail.

From this construction it will be evident that the depression of a key in the multiplier bank will limit the downward movement of the restoring bail $A^{12}$ and it is the restoring bail that controls the setting of the graduated stop plates $A^4$, the latter in turn controlling the setting of sliding rack bars B and $B^1$ according to the product of the multiplicand (as set up on the amount keys) and multiplier (as set up on the multiplier bank).

*Graduations of stop plates*, (Figs. 17 and 23.)

By reference to Fig. 23 (which illustrates the graduated stop plate of one of the "7" keys) the arrangement of the graduations will be clearly understood. This plate is cut according to the multiplication table of seven, the multiplier determining the number of spaces said plate is allowed to drop. Thus when nine is the multiplier, said plate will be permitted to drop two spaces; when eight is the multiplier four spaces, etc. The upper spaces, of these sets of two spaces each, are cut a sufficient number of spaces in a radial direction to determine the number of units in the product of seven multiplied by a certain multiplier. The lower space of each set of two spaces is cut a sufficient number of spaces in a radial direction to determine the number of tens in the product. Thus it will be plain that the circumferential graduations denote the multiplier and that the radial graduations denote the product.

In Fig. 17 the "7" amount key and the "4" multiplier key are shown in depressed position. The depression of the "7" amount key has released the "7" stop plate and the initial stop plate of its associated bank and has also locked from depression all other amount keys in the same bank. The depression of the "4" multiplier key has moved a stop projection $A^{20}$ into the path of the stud $A^{21}$, thereby limiting the downward movement of said stop plates. The depression of the "4" multiplier has also locked from depression all the other multiplier keys. The rack bars B and $B^1$ are shown seated against the gradnations of the stop plate $A^4$, it being noted that the units bar B has moved forward eight spaces and the tens bar $B^1$ two spaces, making the product of seven multiplied by four, viz: twenty-eight.

*Actuating rack bars*, (Figs. 1, 2, 3, 5 and 6.)

The actuating rack bars B and $B^1$ are arranged in pairs, one pair for each bank. The bar B of each bank is situated at the right of the set of stop plates and provided at its forward end with a lateral projection or shelf $B^2$ which extends toward the left (see Figs. 1 and 6) far enough to span its associated set of stop plates. These bars B extend rearwardly and over the rear accumulator and mesh therewith during their return stroke.

The bar $B^1$ of each bank is situated at the left of the set of stop plates in a lower plane than the bar B and provided at the forward end with a lateral projection or shelf $B^3$ which extends toward the right far enough to span its associated set of stop plates. These bars $B^1$ extend rearwardly and under the rear accumulator and each bar $B^1$ meshes with the accumulator pinion of next higher denomination to that with which its companion rack B meshes, and during forward stroke to register the tens of a product.

The units pinion of the rear accumulator has no tens rack bar ($B^1$) but two alining teeth $B^4$ are cut in a bracket secured to the base of the machine (see Fig. 5), and said pinion engages and is locked by said teeth when out of engagement with the units rack bar B. The rear accumulator is composed of ten accumulating pinions, the tenth pinion being necessary to accumulate the tens of products of the ninth bank. For the tenth pinion there is provided a rack bar $B^5$ (see Figs. 1, 3 and 6) which is identical with the bars B excepting that it extends farther forward (this is to avoid interference between its lateral shelf $B^6$ and the bracket $B^7$) and its shelf is narrower. This rack bar is for the purpose of totalizing from said tenth accumulator pinion and co-acts with and is blocked by a special stop plate $B^9$ which is similar to the initial stop plates $A^{13}$ and is released by the depression of the total, sub-total or product keys as later described. All of the rack bars are mounted upon cross-rods $B^{10}$ and $B^{11}$ at the rear of the machine and upon cross rods $B^{12}$ and $B^{13}$ which are secured in brackets $B^7$ and $B^8$ and are held from lateral displacement by sleeves surrounding said shafts.

The rack bars are spring drawn forward by springs $B^{14}$, (Fig. 2), which are interposed between said racks and a cross-plate $B^{15}$ secured to the brackets $B^7$ and $B^8$, and are restored by a square restoring bar $B^{16}$. Said restoring bar extends across the machine in the path of shoulders on the rack bars and is mounted between two reciprocating bars $B^{17}$ and $B^{18}$, (Figs. 3 and 5) one on either side of the machine. Said bars $B^{17}$ and $B^{18}$ are mounted to slide on the shafts $B^{11}$ and $B^{13}$ (see Figs. 1, 3, 4, 5 and 6). Pivoted at $B^{20}$ on each of the units rack bars B and the bar $B^5$ of the tenth pinion of the rear accumulator are a series of downwardly and forwardly extending front accumulator actuating rack bars $B^{21}$ which at their forward ends surround a cross-rod $B^{22}$ and are held from lateral displacement by sleeves surrounding said cross rod.

*Front accumulator*, (Figs. 1, 2, 4, 7, 8, 9 and 10.)

The front accumulator consists of ten number wheels D and their companion gear pinions $D^1$ which are strung upon a shaft $D^2$ carried by a pair of arms $D^3$ journaled on a cross-rod $D^4$. The pinions $D^1$ are adapted to be operated upon by racks $D^5$ which are connected by pin-and-slot connections to slide upon the bars $B^{21}$. This allows each rack a movement independent of its bar $B^{21}$, sufficient to allow for the carry or transfer. A spring $D^6$ secured at one end to the rack and at the other end to the bar $B^{21}$ tends to slide the rack on said bar. Normally the rack is retained against such movement by the engagement of a stud $D^7$, (see Fig. 9) projecting from its right side, with the forward edge of an ear $D^8$ of the transfer pawl $D^9$ of next bank to the right. It will of course be understood that the units rack does not partake of the extra movement to effect a transfer, so its stud simply contacts with a fixed stop $D^{10}$ (see Figs. 4, 7 and 8).

There is one of the pawls $D^9$ for each bank and each pawl is formed with a beveled nose $D^{11}$ to be acted upon by the usual transfer pin $D^{12}$ on the next lower wheel D whereby the pawl will be moved by said pin to take the ear $D^8$ out of the path of the stud $D^7$. The rear edge of the nose $D^{11}$ of said pawl constitutes a zero stop when the wheel is rotated reversely, as in the taking of totals or the clearing of the accumulator.

It will be understood that the tripping of a transfer pawl may take place when the rack with which that pawl is associated is itself out of normal and operating upon its own pinion. Consequently it is necessary to maintain the pawl in displaced position after the transfer pin has passed the beveled nose of the pawl. This is provided for by latches $D^{19}$ which are loosely mounted upon a fixed cross-rod $D^{13}$ and connected by springs $D^{14}$ to the transfer pawls $D^9$, the springs thus serving not only to impel the latches toward latching position but also to hold up the transfer pawls. The latches are formed at their lower ends with notches $D^{15}$ and normally extend past laterally extending ears $D^{16}$ formed on the lower arms of the transfer pawls, against which they are held by springs $D^{14}$ (see Figs. 7 to 10). It will be understood from the above that when a pawl is displaced the latch moves its notch $D^{15}$ engaging with the ear $D^{16}$ and holding said pawl displaced so that the stud $D^7$ may advance over the ear $D^8$ and the rack $D^5$ therefore partake of the extra movement for adding one on the next higher wheel to that which has tripped the pawl. When the rack advances and the stud travels over the ear $D^8$ a laterally extending ear $D^{17}$ (see Figs. 7 to 10) will strike an upstanding arm $D^{18}$ of the latch $D^{19}$ and the spring $D^6$ being superior to the spring $D^{14}$ the latch will be carried away from the ear $D^{16}$. When this takes place the pawl moves slightly upward until the upper side of the ear $D^8$ strikes the stud $D^7$. This movement is sufficient to prevent the latch from reëngaging over the ear $D^{16}$ of the transfer pawl, when the rack moves forward in the next operation of the machine. Consequently in such subsequent operation when the stud $D^7$ moves beyond the ear $D^8$ the latter will move upward in behind said stud, the transfer pawl being restored to normal position by the spring $D^{14}$. Thus all the parts are restored to normal position. Restoring movement of transfer pawls is limited by abutment of their lower arms against spacing collars on the cross-rod $D^{13}$.

Mounted rigidly upon a cross-rod $D^{20}$ are a series of depending arms $D^{21}$ which have cut in their lower edges alining teeth for the purpose of holding the pinions $D^1$ in proper alinement when the accumulator is swung out of operative relation with the racks.

A shield $D^{22}$ is provided for the front accumulator, having cut therein sight openings to disclose single numerals or ciphers on the wheels D.

*Rear accumulator*, (Figs. 5, 11, 16.)

The rear accumulator is carried by arms E mounted on a cross-rod $E^1$ and consists of ten, 20-tooth, gear pinions $E^2$ having secured thereto arms $E^3$ carrying transfer pins $E^4$ at either end.

Transfer mechanism associated with the bars B is precisely the same in function as that of the front accumulator, the parts in the former being changed to accommodate the difference in relation of surrounding mechanism.

The transfer pawls $E^5$ are tripped by the transfer pins $E^4$ to remove the ear $E^6$ therefrom the paths of the studs $E^7$ on the actuating racks $E^8$, the latter being mounted through slot-and-pin connections on the bars B and driven rearward by springs $E^{11}$ connecting them with the latter. Said transfer pawls are held displaced by latches $E^9$ which are tripped at the end of the operation of the machine by laterally extending ears $E^{10}$ coacting with downwardly extending feet $E^{13}$ of the said latches. The units rack is blocked by a fixed stop $E^{12}$ contacting with the ear $E^{10}$ (see Fig. 5).

The transfer mechanism of the lower (tens) bars $B^1$ is substantially different from the transfer mechanisms already described, in that it is operated as soon as tripped. This is necessary for the reason that the adding is done on the forward stroke of the bars $B^1$. The racks F are mounted on the bars $B^1$ through a slot-and-pin connection and drawn forward by springs $F^1$ and each rack has formed on its rearward extremity a lateral beveled ear $F^3$ (more clearly shown in Fig. 16) in front of which normally stands a vertical projection $F^4$ of a swinging latch plate or shelf $F^5$. Said shelf is mounted upon two ears $F^6$ which are punched out from the bar $B^1$ and the shelf is drawn toward the ear $F^3$ by a spring $F^7$ (see Fig. 12).

Pivoted upon a cross-rod $F^8$ is a series of transfer pawls $F^9$ which are spring-drawn toward their normal position and whose forward ends rest on the shelves $F^5$, said ends having formed thereon beveled noses $F^{10}$ with which the transfer pins $E^4$ coact to cam the transfer pawls downward, thereby tilting the shelves $F^5$. It will be plainly seen that as soon as the vertical projection of a shelf is moved by the action of the transfer pawl of next lower bank, sufficiently to clear the beveled ear $F^3$, the spring $F^1$ which is interposed between the rack F and the bar $B^1$ will advance said rack to turn in the transfer. The racks F in this case have forward extensions with studs engaged by bifurcated upper arms of levers $F^{12}$ which are pivoted on the bars $B^1$ and whose depending arms are adapted to be acted upon by a bail $F^2$ to restore the transfer mechanism to normal at the last part of the machine's operation.

*Accumulator control for adding*, (Fig. 3.)

The front accumulator pinions $D^1$ are normally in mesh with their racks $D^5$ and the rear accumulator pinions $E^2$ are normally in mesh with the units (upper) racks $E^8$. Both accumulators are thrown out of mesh with their respective racks at the outset of the handle stroke and remain out of mesh during the forward movement of said racks, returning to mesh with the start of the return movement. The rocking of the rear accumulator is accomplished by the reciprocation of a bifurcated pitman I Fig. 3, operated upon by a four-armed oscillating lever Z which swings loosely on the shaft $C^7$, said bifurcated pitman being pivoted at its rear end to a downwardly extending arm $I^2$ secured to the left-hand arm E of the rear accumulator frame. Said arm $I^2$ has cut in its lower edge two V-shaped notches with which coact an alining and locking lever $I^3$ pivoted on the side frame of the machine and spring-drawn toward said notches. Mounted on the forwardly extending arm of the lever $I^3$ is an anti-friction roller $I^4$ which is acted upon by a cam $I^5$ secured to the shaft $C^{12}$ to lock the rear accumulator in its set position during the forward travel of the racks, at the completion of which it is unlocked to allow the accumulator to be set in its second position, after which it will be locked again during the return travel of said racks, being again unlocked upon completion of said return travel. Oppositely extending arms of the lever Z have studs $Z^1$ and $Z^2$ which are adapted to be acted upon to rock said lever by a pawl $I^6$ (similar to the 821 pawl of the regular Burroughs machine) pivoted on the end of an oscillating arm $I^7$ and spring-drawn toward a radial position by a spring $I^8$. The arm $I^7$ is secured to the rock shaft C and is formed with a locking cam $I^9$ which acts upon an anti-friction roller J of a locking arm $J^1$ for the front accumulator, which performs the same function in the same manner for the front accumulator as the locking lever $I^3$ does for the rear accumulator, the forward end of said arm $J^1$ engaging V-notches of an arm $J^5$ secured to the left-hand side piece $D^3$ of the front accumulator frame.

The upper fork of the pitman I is slotted at $I^{10}$ to slide upon a pin $I^{11}$ secured in the rear end of a bell-crank $I^{12}$ whose setting movement is controlled by the product key as hereinafter described. Said upper fork is also formed with a shoulder $I^{13}$ and a notch $I^{14}$ with which a stud $I^{15}$ in an arm of the lever Z coöperates. The lower fork of said pitman is also formed with a notch $I^{16}$ whose rear edge extends upwardly to form a shoulder $I^{17}$. With this notch a stud $I^{18}$ mounted on another arm of the lever Z coöperates.

The forward accumulator is rocked by a bifurcated pitman $J^2$ which coöperates with studs $J^3$ and $J^4$ mounted upon the upwardly and downwardly extending portions of the arm $J^5$ which is secured to the left side piece $D^3$ of the front accumulator frame. The pitman $J^2$ is reciprocated by a stud $J^6$ upon the four-armed lever Z engaging a notch $J^7$ (see Fig. 18) cut in the rear end of said pitman. The latter is supported at its rearward end by a stud $J^8$ which is mounted in a depending projection of a bell crank lever $J^9$ and extends through a slot in said pitman. In the lower fork of the pitman $J^2$ is cut a notch $J^{10}$ which is adapted to engage with the stud $J^4$. The upper fork of said pitman has a similar notch $J^{11}$ which engages with the stud $J^3$. In the forward central portion of the pitman $J^2$ there is mounted a pin $J^{12}$ which is adapted to ride along the under edge of a pivoted plate K controlled by the total and sub-total keys. A spring $K^1$ connecting said plate and the pin $J^{12}$ tends to keep them in engagement. The plate is additionally held toward its normal position by a spring $K^3$. (Figs. 18 and 19).

Addition being done on the front accumulator, it is necessary to throw the rear accumulator out of mesh with the units racks $E^8$ and into mesh with the tens racks F (which are inoperative during addition) and to keep said accumulator in mesh with the tens racks throughout the entire forward and return travel of the units racks. The front accumulator is out of mesh during the forward travel of the racks and in mesh during their return travel. This control is accomplished as follows: During the first part of the forward handle pull, and before the racks commence their forward travel, the pawl $I^6$ acts upon the stud $Z^1$ to rock the lever Z in a clockwise direction. This causes the stud $I^{18}$ to act upon the shoulder $I^{17}$ of the lower fork of the pitman I to force said pitman rearwardly, thereby throwing the rear accumulator into mesh with the tens (lower) racks.

The stud $J^6$ being in engagement with the notch $J^7$ of the pitman $J^2$ forces said pitman forward, thereby causing the front accumulator to be thrown out by reason of the notch $J^{10}$ acting upon the stud $J^4$ (Fig. 3). This condition is preserved until the beginning of the return stroke of the handle when the pawl $I^6$ will act upon the stud $Z^2$ to rock the lever Z in the reverse or counter clockwise direction. This causes the pitman $J^2$ to be forced rearwardly again, thereby throwing the front accumulator into mesh with its racks. In this adjustment the return to normal of the lever Z will not affect the pitman I, (studs $I^{15}$ and $I^{18}$ being out of their notches $I^{14}$ and $I^{16}$), therefore it is necessary to provide independent means to return the rear accumulator to normal position. To this end there is provided a bell cranked arm $I^{19}$ (Fig. 3) pivoted on the side frame of the machine, whose upper end straddles a stud $I^{20}$ on the pitman I and whose lower forward end is provided with stud $I^{21}$ adapted, during the last part of the return stroke of the operating handle, to be operated upon by the lower edge of the arm $I^7$ to rock the rear accumulator into mesh with the upper or units rack.

It will be understood that when doing simple addition the multiplier keys will be idle and hence no stops will be set for the restoring frame $A^{12}$ and it will therefore descend to the limit and any graduated plate $A^4$ released by a key will correspondingly descend bringing its uppermost section in line with the rack bar flanges and this being the #1 multiplication section of course the stop for the units rack is as many radial steps in from the periphery of the plate as there are units represented by the depressed key, (see Fig. 25), whereas the stop for the tens rack is at the periphery preventing movement of such rack. Obviously the units rack stops serve for simple addition and the tens racks do not come into play.

*Accumulator control for multiplying,*
(Figs. 3 and 21.)

Multiplication is done on the rear accumulator only, therefore it is necessary to throw out the front accumulator and have it remain out until the final part of the operation of the machine. The rear accumulator is to be in mesh with the tens (lower) racks during the forward travel of the racks and in mesh with the units (upper) racks during the return travel of said racks. A special key is provided for conditioning the machine to multiply, such key being designated M and located at the upper left-hand corner of the keyboard (Fig. 1) and arranged to slide vertically through the keyboard plate, upheld by a spring. Said key is provided with a lateral projection $L^x$ which is adapted to be engaged, when said key is depressed, by the upper hooked end of a bell crank arm $M^1$, (Fig. 21) said arm being spring-drawn toward the projection $L^x$ and against a stop pin $M^{11}$ by a spring $L^1$, connecting it with a pin $L^2$ in the side frame of the machine. This arm $M^1$ serves to lock the multiplier key in its depressed position until said arm is rocked by the depression of the product key P which slides through the keyboard plate next forward of the multiplication key, is spring-held and has a stud at the lower end of its stem bearing on a branch of the arm $M^1$. A spring $J^{13}$ connects the pin $L^2$ and the stud $J^8$ of the lever $J^9$, tending to draw the latter toward its normal position, said lever underlying a stud on the lower end of the multiplication key stem.

The rocking of the lever by depression of said key causes the rear end of the link $J^2$ to be lowered to disengage its notch $J^7$ from the stud $J^6$, said stud still being in a position to engage a shoulder $J^{20}$ formed by the upwardly extended forward edge of said notch (see Fig. 21). Pivoted loosely at $M^2$ is an arm $L^3$ bifurcated at its rear end to engage a stud on the bell crank $I^{12}$ and provided with a stud $L^4$. The lever $J^9$ contacts with this stud and when the multiplication key is depressed lowers said arm, rocking the bell crank and elevating the forward end of the rear bifurcated pitman I until its notch $I^{16}$ engages with the stud $I^{18}$ of the four-armed oscillating lever Z. The arm $L^3$ extends forwardly from its pivot $M^2$ and is connected by a spring $L^5$ to a pin $L^6$ on the lower branch of arm $M^1$, against which pin the lower edge of said forward extension of the arm $L^3$ normally rests (see Fig. 3). In the above adjustment, as shown in Fig. 21, said spring $L^5$ serves to return the arm $L^3$, the lever $I^{12}$ and the pitman I to their normal adjustment at the end of the operation.

From the above described adjustment effected by depression of the multiplication key, it will be clear that during the first part of the forward pull of the operating handle when the pawl $I^6$ acts upon the stud $Z^1$ the rear accumulator will be thrown into mesh with the tens racks and at the first part of the return stroke when the pawl $I^6$ acts upon the stud $Z^2$ will be returned to normal position in mesh with the units racks. The rear end of the forward bifurcated pitman $J^2$ having been lowered as described to disengage its notch $J^7$ from the stud $J^6$ of the four-armed lever Z as described, is still in position to have its shoulder $J^{20}$ acted upon by said stud to throw out the front accumulator at the outset of the operation. The return movement of the lever, however, has no effect on said pitman, the stud $J^6$ not being in the notch, so that the front accumulator remains disengaged from its racks. Independent means are provided for restoring the front accumulator to its normal position of engagement with the racks at the conclusion of the operation, as follows: A bell crank lever Y is pivoted on the same stud as locking lever $J^1$ and its bifurcated forward end engages a stud on a rear branch $J^{21}$ of the arm $J^5$. Said bell crank lever is actuated at the last part of the operation by a link $Y^1$ coupled to its depending arm guided on a stud $Y^2$ and provided with an antifriction roller adapted to be engaged by a downward projection of the arm $I^7$.

It will be understood that when the multiplication key is depressed with effects such as above pointed out, the procedure for multiplying involves the depression of amount keys $A^x$ to set up the multiplicand and the depression of the multiplier key A# with the result heretofore mentioned of releasing certain indexing plates $A^4$ and the associated initial stop plates $A^{13}$. Then upon pull of the operating handle the frame $A^{12}$ drops an extent determined by the depressed multiplier key, causing the released indexing plates $A^4$ to lower and bring into line with the rack-bar flanges $B^2$ and $B^3$ the proper sections of the plates to measure advance of the bars, the upper bars for the units registration and the lower bars for the tens registration. The rear accumulator having been engaged with the racks of the lower bars, the advance of the latter effects registration on pinions beyond the units pinion of the rear accumulator whenever multiplication runs into tens. In the example heretofore mentioned of multiplying 5483 by 683, this first operation, when the handle had been pulled forward, would register on the third, fourth and fifth pinions the amount 112 leaving the first two right-hand pinions at zero. Then in the return of the handle, the pinions having first been shifted into engagement with the upper racks, a sort of registration of 6249 would be made, leaving the fifth pinion from the left registering 1. Of course this registration might be such as to call for carrying, which would be taken care of by the transfer mechanism already described, at the very end of the operation. In the succeeding operation with the multiplicand set up one decimal place to the left and the next digit of the multiplier set up, there would be a carry during the advance of the racks in the example above given, for to the registration 17449 would be added 362 on the pinions already registering 174. This would of course be taken care of by the transfer mechanism heretofore described as associated with the lower racks, so that at the end of the forward handle pull the registration would be 453649. Then upon return of the handle this would be changed to 506,089. The third operation with the mutiplicand set up another decimal place to the left would in like manner result in registration of the product 3795889.

*Control of accumulators for taking a product*, (Figs. 2, 6, 11, 22.)

The product is taken from the rear accumulator by the units racks and transferred to the front accumulator where it can be read and preserved for addition to it of further products. In this operation the product will also be printed as hereinafter explained. To so transfer the product the rear accumulator is kept in mesh with units (upper) racks during forward travel of said racks and then thrown into mesh with the tens (lower) racks (which have not advanced) during the return travel of the upper racks. The front accumulator is controlled as in addition, i. e., thrown out of mesh during the forward travel of the rack bars and in mesh during their return travel.

A stud on the lower end of the product key bears upon the forwardly extending branch of the latch-lever $M^1$ so that upon depression of said key the multiplier key M will be released. Also the rocking of the latch-lever will operate through the medium of the spring $L^5$, the lever $L^3$ and the bell crank $I^{12}$ to lower the forward end of the pitman I to the position shown in Fig. 22 where the stud $I^{15}$ on the four-armed lever Z engages the upper branch of the pitman in rear of its notch $I^{14}$. The product key moves the arm $M^1$ far enough to disengage the pin $L^6$ thereon from the lower edge of the forward extension of the arm $L^3$, thus tensioning the spring $L^5$. When the four-armed lever Z is now oscillated in a clockwise direction by the pawl $I^6$ there will be no motion imparted to the pitman link I because the shoulder $I^{17}$ of the lower fork of said pitman is lowered out of the path of the stud $I^{18}$ on said lever and hence the rear accumulator pinions will remain in mesh with the upper racks during advance thereof as measured by backward rotation of pinions to zero. The stud $I^{15}$ of said lever Z will be moved opposite the notch $I^{14}$ in the upper fork of the pitman I and the spring $L^5$ through the arm $L^3$ and the bell crank $I^{12}$ will then force the forward end of said pitman downwardly, engaging the notch $I^{14}$ with the stud $I^{15}$. When the pawl $I^6$ acts against the stud $Z^2$ to oscillate the lever Z in a counter clockwise direction the link I will be moved rearwardly to throw the rear accumulator into mesh with the tens or lower racks. The rear accumulator is returned to normal position (in mesh with the units racks) by the arm $I^{19}$ as previously explained, the notch $I^{14}$ of the link I being free from the stud $I^{15}$ at this time by reason of the timing of the key release (later explained), before the lower edge of the arm $I^7$ contacts with the stud $I^{21}$.

The rocking of the arm $M^1$ by the product key causes a thrust-bar $L^7$ to be moved forwardly to rock a bail $L^8$ by contacting with a stud $L^9$ mounted thereon (see Fig. 22), said bar having a bifurcated rear end embracing a stud on the arm $M^1$. Said bail (see Fig. 2) lies in notches cut in the forward ends of locking detents $A^{16}$ of the amount keys and is adapted, when rocked by the depression of the product key (or by the total and sub-total keys as will hereinafter be explained), to contact with the forward edges of said notches to move the detents forward, thereby locking all amount keys from depression. Said bail will be moved against the stress of its spring $L^{10}$ (Fig. 4) each time an amount key in any bank is depressed but this movement is not sufficient to affect the detents of other banks, there being lost motion between the bail and the front sides of the notches.

The rocking of the bail $L^8$ by the product key also serves to draw forwardly a link $L^{11}$ which is coupled to the right hand side of the bail (Fig. 4) and guided on a screw $L^{12}$ in the keyboard side frame $A^2$ and has an ear $L^{13}$ (see Fig. 6) bent inwardly from its rearward end. Said ear is adapted to be moved into the path of a nose $L^{14}$ formed on the rearward edge of the link $A^{22}$, thereby limiting the downward movement of the restoring bail $A^{12}$ to one-half space or just far enough to lower all of the initial stop plates $A^{13}$ and the initial stop plate $B^9$ of the bar $B^5$ of the tenth accumulator wheel, out of the path of the ears or flanges $B^2$ of the units racks but not far enough but what they still block the tens racks. Of course rocking of the bail by depression of amount keys is insufficient to bring the ear $L^{13}$ into effective position. All of the initial stop plates are released when the detents $A^{16}$ are moved forward by the bail $L^8$. Thus it will be seen that the units racks are free to be operated and that the tens racks are blocked during the taking of a product. Of course it will be understood that during the forward travel of the units rack, while the rear accumulator is in mesh therewith the accumulator pinions $E^2$ will be rotated backward or in a direction reverse to that indicated by the arrow in Fig. 2 until their transfer pins $E^4$ abut against the zero stops formed on the forward noses of the transfer pawls $E^5$ (see Fig. 11). This clears the rear accumulator, after which it is thrown in mesh with the tens rack during the return to normal of the units racks when the product is being registered on the front accumulator.

*Control of accumulators for totaling and clearing*, (Figs. 2, 4, 9, 18.)

As the total of added items or added products is taken from the front accumulator the control of the rear accumulator is the same as in addition prohibiting registration on the same. In this operation of totaling and clearing it is necessary that the front accumulator remain in mesh with the racks during the forward travel of said racks and be disengaged therefrom at the beginning of their return travel. During said forward travel of said racks the accumulator wheels D are rotated backwardly or in a direction opposite to that indicated by the arrow in Fig. 2 until the transfer pins $D^{12}$ thereon abut against the zero stops formed by the rear side of the noses $D^{11}$ of the transfer pawls $D^9$ (see Fig. 9).

The total key T slides through the keyboard plate at the forward left-hand corner thereof and is upheld by a spring and its stem has a stud bearing upon a forwardly projecting arm of the plate K. When depressed said key rocks said plate K on its pivot, thereby elevating the forward end of the bifurcated pitman $J^2$ through the spring $K^1$ (Fig. 18). This elevation of the pitman $J^2$ continues until its upper edge contacts with the stud $J^3$ of the arm $J^5$, after which the plate K still continues to be rocked, thereby tensioning the spring $K^1$ (see Fig. 18). As will be seen in said figure the elevation of the forward end of the pitman $J^2$ disengages the notch $J^{10}$ from the stud $J^4$ so that the forward movement of the pitman $J^2$ will not affect the front accumulator, the latter remaining in mesh with its racks which advance until the pinions stop at zero. At the end of such forward movement of the pitman the stud $J^3$ will be in alinement with the notch $J^{11}$, and the forward end of the pitman $J^2$ will be further elevated to cause said notch $J^{11}$ to engage the stud $J^3$ by reason of the tension of spring $K^1$. Said plate K is also connected to the thrust-bar $L^7$ by pin-and-slot $K^2$ so as to move said bar forward and rock the bail $L^8$ to lock the amount keys, release the initial stop plates and limit the downward movement of the restoring bail $A^{12}$ as already explained in connection with the product operation.

*Control of accumulators for sub-totaling*, (Figs. 4 and 19.)

In the taking of sub-totals as in the taking of totals of items or products on the front accumulator, the control of the rear accumulator is the same as in addition. For sub-totaling of course the front accumulator remains in mesh with the racks during the entire operation. The sub-total key S slides through the keyboard plate next forward of the product key P and is upheld by a spring and its stem has a stud engaging a three-armed lever O having a stud $O^1$ which underlies a nose on the plate K to rock said plate and elevate the forward end of the bifurcated pitman $J^2$ through the spring $K^1$ and stud $J^{12}$. In this operation said pitman is elevated far enough to disengage its notch $J^{10}$ from the stud $J^4$ but not far enough (as in the case of depressing the total key) to put the spring $K^1$ under tension after the pitman encounters the stud $J^3$, in consequence of which the notch $J^{11}$ does not engage said stud when the pitman $J^2$ moves forward and so the rearward movement of that pitman does not result in disengaging the pinions from their racks. The arm $O^2$ of the lever O is provided with a stud $O^3$ which contacts with a downwardly and rearwardly extended projection $O^4$ of the thrust-bar $L^7$ to move the latter forward and rock the bail $L^8$, thereby locking the amount key, releasing the initial stops and limiting the downward movement of the restoring bail $A^{12}$ as already explained in connection with the product and totaling operations.

*Control of accumulator for elimination*, (Fig. 20.)

In this case the positioning of the bifurcated pitman is the same as in addition but the front accumulator is to be prevented from return to engagement with the racks, after being initially disengaged, until at the final part of the operation said accumulator is returned to normal position by the bell crank Y as previously explained. This is accomplished by preventing cooperation between the wipe pawl $I^6$ and the stud $Z^2$ of the four-armed lever Z. The depression of the elimination or listing key L which is spring upheld and slides through the keyboard plate next forward the subtotal key, will cause a roller mounted on the lower end of its stem to contact, with camming effect, upon the U-shaped lever N which is pivoted at $N^1$. Said lever N is coupled by a link $N^3$ to the downwardly projecting branch of a long curved arm $N^2$ which extends adjacent the path of movement of the wipe pawl $I^6$. Said curved arm $N^2$ is adapted when lowered by depression of key L to contact with a stud $N^4$ on the wipe pawl $I^6$ and prevent the latter's engagement with the stud $Z^2$ of the lever Z upon the return stroke of the arm $I^7$. The arm $N^2$ and connected parts are restored to normal position by a spring $N^5$ connecting the arm with a stud on the keyboard side frame.

*Printing mechanism,* (Figs. 1, 2, 3, 5.)

The type carriers, $G^x$, of which there are ten to correspond with the ten wheels of the front accumulator and one for special characters, are pivoted on a cross rod G extending between two printer side frames $G^1$ supporting the entire printing mechanism. The amount types $G^2$ are mounted in series of tens on said carriers. The type carriers are connected to the rack bars B through the medium of links $G^{10}$ and gear segments $G^{11}$ which mesh with racks $G^{12}$ secured to said bars. The segments $G^{11}$ are loosely mounted on a cross-rod $G^{13}$ and their rearwardly extending arms converge toward the center of the machine as shown in Fig. 1.

The hammers $G^3$ for driving the type against the platen H are separately pivoted upon a cross-rod $G^4$ and depending portions carry pins engaging short slots in links $G^5$, the latter running to the rear and being coupled to upstanding arms of driving levers $G^6$ separately and loosely mounted upon a cross-rod $G^7$. (The slots in the links $G^5$ provide for slight rebound of type and hammers.) Said levers have rearwardly extending arms connected by springs $G^8$ with an overhead cross-rod $G^9$. The driving levers $G^6$ and consequently the hammers are normally retracted against the stress of springs $G^8$ by a bail comprising a cross-rod $G^{15}$ engaging elbow shaped portions of the levers and arms $G^{16}$ secured to the rod $G^7$. The rod $G^7$ has a crank arm $g$, connected with a crank arm $g'$ on the rock shaft $C^{12}$ by a link $G^{17}$ (see Fig. 5.)

It will be obvious that in the normal condition of parts as illustrated in Fig. 2 the above-described bail holds the driving levers at the limit of their downward movement and the hammers correspondingly retracted. It will also be understood that when the handle starts forward the consequent rocking of the rod $G^7$ moves the bail upwardly and relieves the driving levers of the restraint imposed upon them by this bail. Other devices hereinafter described then control the levers and hammers, such devices being in turn controlled by the type carriers.

The upwardly extending arms of the driving levers project beyond the point of union with the links $G^5$, forming catches $G^{18}$. Separately mounted from each other to rock upon a cross-rod $G^{19}$ are a series of triggers or latches $G^{20}$ formed at their forward ends to engage the catches $G^{18}$ respectively and restrain the driving levers. These latches are drawn upwardly in the rear of the pivot rod $G^{19}$ by springs $G^{21}$ connecting them with the cross-rod $G^9$, said springs of course forcing the front ends of the latches downward. The rear ends of the latches are formed with overlapping tails $G^{22}$ so as to provide for automatic tripping of latches one by another from left to right for filling in of ciphers in a well-known manner.

The latches have upstanding catch projections $G^{23}$ adapted to be severally acted upon by pawls $G^{24}$ loosely mounted independently of each other on a cross-rod $G^{25}$ of a swinging bail comprising arms $G^{26}$ secured to a rock shaft $G^{27}$, the right side arm having a forwardly projecting portion $G^{28}$ provided with a stud $G^{29}$ occupying the recess of a segmental plate $G^{30}$ which is secured to the rod $G^7$. The stud is adapted to be acted upon alternately by the two ends of said recess. Thus as the operating handle reaches the end of its forward stroke the pawls $G^{24}$ will be moved rearwardly and near the end of the return stroke will be returned to their normal position.

Normally the pawls $G^{24}$ stand above the catch projections $G^{23}$ so as to clear the same and not displace the latches. The pawls are so held against the stress of comparatively light springs $G^{31}$ by studs $G^{32}$ on the links $G^{10}$ and a special link $H^2$ hereinafter described. The pawls have forward extensions which overlie these studs and there will be no action of a pawl upon its associated latch unless the associated type carrier is advanced beyond the zero position, that is, unless the type carrier moves a distance determined by a depressed key. When any type carrier is so moved its associated pawl drops to position for engaging the catch projection $G^{23}$ of the associated latch so that when the pawl carrying bail $G^{25}$ swings rearward the latch will be tripped and the associated hammer fired.

It will be understood that, as in the regular Burroughs machine rack bars and type carriers may advance one step to bring zero to the printing line, unaccompanied by movement of racks, by reason of the slotpin-spring connection of racks and bars for transfer purposes. It is this characteristic which postpones the transfer to the end of an operation, whereas, there being no such extra movement of the tens multiplication rack bars, the transfer effected by their racks is not so postponed.

The rear edges of the type carriers are formed with series of V-shaped notches G$^{33}$ and there are loosely mounted upon a cross-rod G$^{34}$ a series of double acting reversible pawls G$^{35}$. On the shaft G$^{34}$ at opposite ends thereof there are mounted bell crank levers, rearwardly projecting arms G$^{36}$ of which support between them a bar G$^{37}$. Between said bar and rearward projections on the pawls G$^{35}$ are interposed springs G$^{50}$ which normally draw on the pawls in a direction to engage the lower branches of the latter with the notched edge of the type carriers.

This mechanism very effectually prevents erroneous imprints and accumulation through rebound or accidental or intentional obstruction of the type carriers or the pressing backward of the same.

When taking a total from the front accumulator it is desirable to have the type carriers locked against forward movement after the accumulator is thrown out. To this end the above mentioned bell cranks have depending arms G$^{38}$ which straddle a rod G$^{39}$ carried by forwardly and upwardly inclined extensions G$^{40}$ of the arms G$^{26}$ of the pawl-carrying bail. This bail is rocked rearwardly at the end of the forward stroke of the handle, thereby causing the spring tie bar G$^{37}$ to be rocked upward far enough to cause the springs G$^{50}$ of the pawls G$^{35}$ to draw on said pawls in a direction to engage their upper branches with the notched edge of the type carriers and prevent further advance of the latter.

At the bottom edges of the type carriers there are formed a series of deep, round bottom notches with which a cross rod G$^{41}$ is adapted to engage to aline the type carriers, said rod being carried by a pair of arms G$^{42}$ loose on a rock shaft G$^{43}$. Arms G$^{44}$ (only one being herein shown) fastened at opposite ends of said shaft are connected to and move the arms G$^{42}$ through springs G$^{45}$. Springs G$^{46}$ interposed between the arms G$^{44}$ and studs G$^{47}$ in the printer side frames serve to restore said arms to normal position.

When the multiplication key is depressed there should be no printing as what is set up in type under such conditions with the handle forward would be uselessly recorded. Hence the hammers G$^{3}$ are blocked by depression of said key. For this purpose a bail J$^{18}$ (Figs. 2 and 21) is secured to the rock shaft J$^{17}$. It has been before explained that depression of said key rocks said shaft. The accompanying forward swing of the bail carries its cross-bar under shoulders of the hammers (Fig. 21) blocking the latter.

Inasmuch as there is no printing with the multiplication key depressed, there is no occasion for line-spacing of the paper and it is preferable not to have any, so that the ultimate record will be compact and in good form. Hence depression of the multiplication key is caused to disable line spacing mechanism, the latter comprising a ratchet wheel $h$, on the roller platen H, a pawl $h'$, and operating connections between the latter and a bail $h^2$ (Fig. 3). The latter is spring-drawn upward and adapted to be lowered through suitable connections with the rock shaft G$^{7}$, including a hook $h^3$ engaging over said bail. This hook is slotted to receive a stud on a lever J$^{16}$ which is connected by a link J$^{15}$ with an upstanding arm J$^{14}$ of the multiplication-key lever J$^{9}$. Depression of said key through said connections rocks the hook $h^3$ rearward as shown in Fig. 21 disengaging it from the bail and thus discontinuing the line-spacing.

*Special character type carrier*, (Figs. 2, 18, 19, 20, 21, and 22.)

The special character type carrier H$^{1}$ is mounted at the right of the amount type carriers and is equipped with four special type: P (for product), S (for subtotal), T (for total) and L (for listing of unaccumulated items).

This carrier is connected to an arm H$^{11}$ loose on the shaft C$^{12}$ (at the bottom of the machine) by a long link H$^{2}$, the upper part of which is similar to the links H$^{10}$. (See Figs. 1 and 2.)

The above mentioned arm has a spring H$^{3}$ interposed between it and the base of the machine which normally exerts its tension to rock the special type carrier clockwise. Said arm is, however, normally upheld by the bail F$^{2}$. From this arrangement it will be plain that as soon as the machine is operated and the bail F$^{2}$ lowered, the spring H$^{3}$ rocks the special type carrier until a stud H$^{4}$ mounted on said carrier abuts against a stepped segment H$^{5}$ which is positioned by the depression of the special keys as will be hereinafter explained. Said stepped segment is secured to a shaft H$^{6}$ which extends to the left-hand side of the machine and has a downwardly extending arm H$^{7}$ connected to a long, horizontally inclined link H$^{8}$ which is differentially adjusted by the special keys. The stepped segment H$^{5}$ normally blocks the special type carrier from movement as shown in Fig. 2.

The link H$^{8}$ which is moved forward to set the stepped segment is slotted at its forward end to embrace the rod D$^{4}$, (Fig. 22) and be guided thereon by two washers H$^{9}$, one on either side of said link. Said link is drawn rearwardly and consequently the stepped segment $H^5$ is drawn upwardly by a spring $H^{10}$ connecting the arm $H^7$ and a stud in the side frame of the machine. The setting of the stepped segment so that its top step (lettered P#) comes into the path of movement of the stud $H^4$ of the special type carrier is accomplished when the product key is depressed (see Fig. 22) by a bell crank $M^5$ which contacts with a pin $M^6$ on the link $H^8$ and is operated upon by a pin $M^7$ mounted on the arm M.

The arm $O^2$ of the lever O, actuated by the sub-total key (Fig. 19), extends downwardly to engage a pin $O^5$ on the link $H^8$ to set the stepped segment $H^5$ so that the second step from the top (lettered S#) comes into the path of movement of the stud $H^4$ of the special type carrier.

A downwardly extending finger $N^7$ (Fig. 20) is rigidly secured to and moves with the arm $N^2$ when the listing or elimination key X is depressed. Said finger engages with a pin $N^8$ on the link $H^8$ to set the stepped segment so that the fourth step from the top (lettered L#) comes into the path of movement of the stud $H^4$ of the special type carrier.

A pin $K^5$ mounted on the plate K, (Fig. 18) which is rocked by the depression of the total key T, engages with an upward projection $K^6$ of the forward end of the link $H^8$ to set the stepped segment so that the third step from the top (lettered T#) will be in the path of movement of the stud $H^4$ of the special type carrier.

*Key release, repeat and correction,* (Figs. 4 and 6.)

Amount keys $A^x$ multiplier keys A# and product, total and subtotal and elimination or listing keys, are held down, by long detents or shutters $A^{25}$ (see Fig. 3) spring-held against them and adapted to engage over projections on their sides in a familiar way (Fig. 6).

Loosely mounted upon the rock shaft C is an arm $A^{27}$ (Fig. 4), which has connected to it an upwardly extending link $A^{28}$ guided on a stud $A^{29}$ in the side frame of the machine. Said link is normally in its lowered position but when released is drawn upwardly by a spring $A^{30}$. The arm $A^{27}$ is operated upon by a stud $A^{31}$ on the full stroke sector $C^2$ to release said arm at the beginning of the operation of the machine and to restore said arm at the final return movement of the sector $C^2$.

Pivoted upon the upper end of the link $A^{28}$ is a bell crank pawl $A^{32}$ between which and said link is interposed a spring $A^{33}$ which tends to rock said pawl in a clockwise direction around its pivot but is normally prevented from doing so by a stud $A^{34}$ in the side frame of the machine. The upper end of said pawl is hooked to engage a stud $A^{35}$ mounted upon an arm $A^{36}$ secured to the right-hand end of the key release shaft $A^{26}$, the latter having studs $a$, Fig. 2, to cam the shutters $A^{25}$ out of engagement with the key projections. Said arm is limited in its upward movement by contacting with part of the keyboard side frame $A^2$. The operation of this mechanism is as follows: During the first part of the upward movement of the link $A^{28}$ the pawl $A^{32}$ will swing upwardly and rearwardly until it contacts with the stud $A^{35}$. Continued upward movement of the link $A^{28}$ will cause the hooked upper end of said pawl to move above and hook over said stud. It will now be plain that during downward or return movement of the link the pawl $A^{32}$ will rock the shaft $A^{26}$ to release the keys, after which it will assume its normal position.

Extending downwardly from the arm $A^{36}$ is a hooked projection $A^{37}$ between which and a stud $A^{38}$ on the keyboard side frame is interposed a spring $A^{39}$ which serves to restore the shaft $A^{26}$.

A repeat key R slides through the keyboard plate and engages a bell crank R' connected to a reciprocating link $A^{43}$ which is guided upon a stud $A^{44}$ on the side frame of the machine and is drawn rearwardly by a spring $A^{45}$. Extending upwardly from the rear end portion of the link $A^{43}$ is a projection $A^{46}$ which is adapted (when the repeat key is depressed) to engage with a stud $A^{47}$ on the pawl $A^{32}$ and prevent it from engaging with the stud $A^{35}$ to work the release shaft, thereby preventing the release of the keys.

A correction key C# slides through the keyboard to a link $A^{41}$ which at its rear end operates upon a stud $A^{40}$ of the arm $A^{37}$ on the releasing shaft $A^{26}$. It will be seen from this construction that the depression of the correction key will rock the shaft $A^{26}$ and release any depressed keys to correct errors in setting up.

*Driving mechanism,* (Figs. 1, 3, 4, 5 and 6.)

The rock shaft C heretofore mentioned extends from the left-hand side frame, across the machine to the outside of the casing on the right where it carries an operating handle $C^1$. Secured to the shaft C near its right-hand end is the full stroke sector $C^2$ which coöperates with a wiper pawl $C^3$ mounted on the right-hand side frame. Forward oscillation of shaft C is limited by abutment of the forward edge of the sector $C^2$ against a stop $C^{26}$ which protrudes upwardly from the base of the machine. A spring $C^{27}$ connecting a crank arm $C^{29}$ on this shaft with the base of the machine, oscillates the shaft rearward. Said sector $C^2$ has mounted thereon an anti-friction roller $C^4$ which is adapted to ride in a cam slot $C^5$ cut in a two-armed oscillating lever $C^6$ secured to the cross-shaft $C^7$. This shaft is provided with two motor springs $C^8$, (Fig. 5), one of which connects the rearward arm of the lever $C^6$ and the cross rod $B^{10}$ (see Fig. 5) and the other of which connects said cross rod $B^{10}$ and an arm $C^9$ secured to the left-hand end of the shaft $C^7$ (Fig. 3). These are the main motor springs which restore working parts moved in opposition to such springs by the forward swing of the handle $C^1$. Motion is as usual transmitted from the lever $C^6$ to other working parts of the machine through the medium of a spring under regulation of a dash-pot, for the purpose of protecting the machine from injury which might otherwise result from too vigorous use of the operating handle. The spring employed for such purpose is designated $C^{10}$ and secured at its forward end to the lever $C^6$ and at its rear end to an arm $C^{11}$ fastened to the rock shaft $C^{12}$ at the rear of the machine, said spring as usual surrounding a telescopic link $C^{13}$. Extending upwardly from the shaft $C^{12}$ is an arm $C^{14}$ which is connected by a link $C^{15}$ to a downwardly extending arm $C^{16}$ secured to a rock shaft $C^{17}$. The shaft $C^{17}$ has, toward its left hand end (see Fig. 3) an upwardly extending arm $C^{18}$ which is connected by a link $C^{19}$ to the dash-pot W.

Secured rigidly to the shaft $C^{17}$ and extending downwardly, at the left-hand side of the machine is an arm $C^{20}$ which is identical with the arm $C^{16}$ on the right-hand end of said shaft (Fig. 5). These two arms are connected by links $C^{21}$ to the bars $B^{17}$, $B^{18}$ which support between them the rack restoring bar $B^{16}$. It will be noted that the cam slot $C^5$ is formed concentric to the shaft C for more than half its length. This is to allow time for the graduated stop plates to become positioned before the actuating rack bars start and to allow sufficient movement of the sector $C^2$, after the restoration of the actuating rack bars, to restore said graduated stop plates.

Loosely mounted on the shaft C beside the sector $C^2$ is a restoring arm $C^{22}$ which is provided with a stud $C^{23}$ engaging in a concentric slot $C^{24}$ in the sector $C^2$. Said arm is also provided with an anti-friction roller $C^{25}$ which coacts against the right side arm of the restoring bail $A^{12}$ to restore said bail to normal position. The arm $C^{22}$ is limited in its downward movement by abutting against the stop $C^{26}$. The slot $C^{24}$ is for the purpose of delaying the restoration of the arm $C^{22}$ until after the two-armed lever $C^6$ has been fully returned to normal.

It will now be seen that the above described machine is capable of use either as a straight adding machine, when the front accumulator only would come into play, or as a machine for doing direct multiplication. Fig. 24 shows an example of work where both adding and multiplying functions come into play. The first item merely represents the imprint of an amount accumulated on the front wheels. The second imprint represents a multiplicand which is characterized by the letter L indicating non-registration. The next imprint is that of the multiplier similarly characterized. There being four digits in this multiplier, four operations of the machine will take place without printing or line-spacing. Then an operation of the machine with the product key depressed will result in printing the product as shown in this example accompanied by the letter P to characterize the same, this product being transferred from the rear wheels to the front wheels. The next imprint in the said example is that of an amount added to the sum of the first item and the product on the front wheels. Then follows the imprint of a subtotal taken from said front wheels. Following this is an imprint of another added amount. Then a multiplicand, followed by a multiplier and immediately below the latter a product. The last imprint is that of a grand total characterized by the letter T and being the sum of the several added amounts and the two products.

Fig. 25 represents a different example of work in which the laterally movable paper carriage comes into play for making out accounts. It will be noted that this example of work comprises several multiplicands and multipliers along the same horizontal lines and then products also along such lines, there thus being produced first a column of multiplicands, next a column of multipliers and finally a column of products and under the latter there is printed a total of the products. The before-mentioned roller platen H is journaled in a laterally shiftable frame $H^4$ in which the line spacing bail $h^2$ is mounted. In connection with the example of work shown at Fig. 25 it is to be assumed that this platen carrying frame or carriage is shifted by hand and it may also be assumed that the line spacing is done by hand, the carriage having an equipment by which to throw out the automatic line spacing. Thus there is a lever $h^5$ (Fig. 3) pivoted upon a slide $h^6$ which carries the pawl $h^1$, said lever hooking over a stud on a bell crank lever $h^7$. The latter is pivoted upon the carriage and engages an arm $h^8$ projecting forward from the rock shaft of the bail $h^2$. By shifting the lever $h^7$ from the position shown in Fig. 3 it is disengaged from said bell crank lever so that the latter oscillates idly. Line spacing by hand is accomplished through the medium of a handle lever $h^9$, Fig. 3ᵃ, movable horizontally on the carriage and acting against the pawl slide $h^6$.

I claim:

1. In a machine of the character described, the combination of a reciprocating prime mover; register wheels; actuators therefor; and multiplicand and multiplier setting up devices controlling movement of said actuators, the latter adapted during the stroke of the prime mover in one direction to register units of the product and during the stroke of the prime mover in the opposite direction to register tens of the product; said setting up devices comprising multiplication indexing stops, means for selectively releasing them as determined by the multiplicand, and means for regulating the extent of their movement when released as determined by the multiplier.

2. In a machine of the character described, the combination of accumulator wheels denominationally arranged, manipulative amount determining devices, and duplex actuators alternately effective and arranged in pairs for adjacent wheels, the said amount determining devices including multiplication indexing stops, means for selectively releasing them as determined by the multiplicand, and means for regulating the extent of their movement when released as determined by the multiplier.

3. In a machine of the character described, the combination of accumulator wheels denominationally arranged, manipulative amount determining devices, and two sets of actuators reversely related to the wheels and arranged in pairs for adjacent wheels, the said amount determining devices including multiplication stops, means for selectively releasing them as determined by the multiplicand, and means for regulating the extent of their movement when released as determined by the multiplier.

4. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, and manipulative amount-determining means including multiplication indexing stops, means for selectively releasing them as determined by the multiplicand, and means for regulating the extent of their movement when released as determined by the multiplier.

5. In a machine of the character described, the combination of accumulator wheels denominationally arranged, and duplex actuators alternately effective and arranged in pairs for adjacent wheels, a set of multiplication indexing stops for each pair of actuators, a set of keys directly controlling said stops respectively whereby any one of them can be selected and released to represent a digit of a multiplicand, and a set of multiplier keys and connections for regulating the extent of movement of released stops whereby to measure movements of the actuators for the registering of the product.

6. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, keys for the plates of a set respectively, and means for variously limiting movement of the plates released by the keys.

7. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, keys for the plates of a set respectively, a set of stops to reversely limit movement of plates when released by keys and a set of keys controlling said stops.

8. In a machine of the character described, the combination of a set of pinions denominationally arranged, sliding bars arranged in pairs, a bar of a pair extending on one side of a pinion and the other bar of the same pair extending on the opposite side of the adjacent pinion and the two bars of the pair having stop portions in alinement; a set of indexing plates for each pair of bars each plate having a double series of graduated stops for said stop portions of the bars, keys for the plates of a series respectively, means for variously limiting movement of plates released by their keys, racks carried by the bars, and means for reciprocating the latter and engaging and disengaging the racks and pinions.

9. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, an initial stop plate for each pair of bars, keys for the indexing plates of a set respectively and adapted to severally release the same, each key adapted to release the initial stop plate; and means for variously limiting the movement of released index plates.

10. In a machine of the character described, the combination of a set of pinions denominationally arranged, sliding bars arranged in pairs, a bar of a pair extending on one side of a pinion and the other bar of the same pair extending on the opposite side of the adjacent pinion and the two bars of the pair having stop portions in alinement; a set of segmental pivoted indexing plates for each pair of bars each plate peripherally graduated in double series for coaction with the stop pinions of the bars to measure excursions of one set of the latter in registering units and excursions of the other set in registering tens of products; keys and detents normally restraining said plates; means for variously limiting movement of plates when released, racks carried by the bars; and means for reciprocating the latter and engaging and disengaging the racks and pinions.

11. In a machine of the character described, the combination of a set of pinions denominationally arranged, sliding bars arranged in pairs, a bar of a pair extending on one side of a pinion and the other bar of the same pair extending on the opposite side of the adjacent pinion and the two bars of the pair having stop portions in alinement; a set of segmental pivoted indexing plates for each pair of bars each plate peripherally graduated in double series for coaction with the stop pinions of the bars to measure excursions of one set of the latter in registering units and excursions of the other set in registering tens of products; keys and detents normally restraining said plates; a restoring frame or bail for the plates; stops to variously limit retraction of said frame; keys controlling said stops; racks carried by the bars, and means for reciprocating the latter and engaging and disengaging the racks and pinions.

12. In a machine of the character described, the combination of accumulator wheels denominationally arranged and having transfer tripping projections, manipulative amount determining devices, and duplex actuators alternately effective and arranged in pairs for adjacent wheels, the said amount determining devices including indexing means to differently measure excursions of the two actuators of a pair; together with separate transfer mechanisms for the different sets of actuators, comprising different members upon which the transfer tripping wheel-projections operate.

13. In a machine of the character described, the combination of accumulator wheels denominationally arranged and having transfer tripping projections, manipulative amount determining devices, and two sets of actuators reversely related to the wheels and arranged in pairs for adjacent wheels, the said amount determining devices including indexing means to differently measure excursions of the two actuators of a pair and said actuators being movable independently of said indexing devices for transfer purposes; together with separate transfer mechanisms for the different sets of actuators, said transfer mechanisms comprising different members upon which the transfer tripping wheel-projections operate.

14. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, and manipulative amount-determining means including indexing devices to differently measure excursions of rack bars of the same pair; together with separate transfer mechanisms for the two sets of racks, comprising mountings for the same permitting one-step movement independently of the bars, springs connecting the racks and bars, detents for the racks tripped by the pinions, latches for detents of one set of racks, said detents being mounted on fixed bearings while the detents for the other set of racks are mounted on the bars carrying such racks, tripping devices for the latter detents, and a restoring member for the racks associated therewith.

15. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, an initial stop plate for each pair of bars, adapted to normally permit one-step movement of bars carrying racks which normally advance disengaged from the pinions while blocking movement of the other bars; keys for severally releasing indexing plates and each key of a set adapted to release the initial stop plate associated with such set; means for variously limiting the movement of released index plates; and means for reciprocating the rack bars.

16. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, an initial stop plate for each pair of bars, adapted to normally permit one-step movement of bars carrying racks which normally advance disengaged from the pinions while blocking movement of the other bars; keys for severally releasing indexing plates and each key of a set adapted to release the initial stop plate associated with such set; means for variously limiting the movement of released index plates; means for reciprocating the rack bars; and separate transfer mechanisms for the two sets of racks, comprising mountings for the same permitting one-step movement independently of the bars, springs connecting the racks and bars, detents for the racks tripped by the pinions, latches for detents of one set of racks, said detents being mounted on fixed bearings while the detents for the other set of racks are mounted on the bars carrying such racks, tripping devices for the latter detents, and a restoring member for the racks associated therewith.

17. In a machine of the character described, the combination of accumulator wheels denominationally arranged, and duplex actuators alternately effective and arranged in pairs for adjacent wheels, a set of multiplication indexing stops for each pair of actuators, a set of keys directly controlling said stops respectively whereby any one of them can be selected and released to represent a digit of a multiplicand, a stop common to and displaceable by any one of said keys which stop normally intercepts the actuators, and a set of multiplier keys and connections for regulating the extent of movement of released stops whereby to measure movements of the actuators for the registering of the product.

18. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, an initial stop plate for each pair of bars, adapted to normally permit one-step movement of bars carrying racks which normally advance disengaged from the pinions while blocking movement of the other bars, keys for severally releasing indexing plates and each key of a set adapted to release the initial stop plate associated with such set, means for variously limiting the movement of released index plates, means for reciprocating the rack bars; and type carriers connected to the bars carrying racks which normally advance disengaged from the pinions.

19. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, an initial stop plate for each pair of bars, adapted to normally permit one-step movement of bars carrying racks which normally advance disengaged from the pinions while blocking movement of the other bars, keys for severally releasing indexing plates and each key of a set adapted to release the initial stop plate associated with such set, means for variously limiting the movement of released index plates, means for reciprocating the rack bars, type carriers connected to the bars carrying racks which normally advance disengaged from the pinions, and separate transfer mechanisms for the two sets of racks; that for the racks which normally advance disengaged from the pinions including the mounting of the said racks to permit one-step movement thereof independently of the bars.

JESSE G. VINCENT.

Witnesses:
GRACE J. MAHON,
T. P. DAVIS.